United States Patent
Sugimoto

(10) Patent No.: US 11,064,135 B2
(45) Date of Patent: Jul. 13, 2021

(54) IMAGE CAPTURING APPARATUS, CONTROL METHOD FOR IMAGE CAPTURING APPARATUS, AND CONTROL PROGRAM FOR IMAGE CAPTURING APPARATUS

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 16/697,140

(22) Filed: Nov. 26, 2019

(65) Prior Publication Data

US 2020/0099867 A1 Mar. 26, 2020

Related U.S. Application Data

(63) Continuation of application No. PCT/JP2018/014269, filed on Apr. 3, 2018.

(30) Foreign Application Priority Data

Jun. 21, 2017 (JP) .............................. JP2017-121443

(51) Int. Cl.
*H04N 5/235* (2006.01)
*H04N 5/232* (2006.01)
(Continued)

(52) U.S. Cl.
CPC ........... *H04N 5/243* (2013.01); *H04N 5/2351* (2013.01)

(58) Field of Classification Search
None
See application file for complete search history.

(56) References Cited

U.S. PATENT DOCUMENTS 6,285,834 B1 * 9/2001 Hylen ...................... G03B 1/48
396/316
9,057,932 B2 6/2015 Guan
(Continued)

FOREIGN PATENT DOCUMENTS

CN 102986208 3/2013
CN 103858043 6/2014
(Continued)

OTHER PUBLICATIONS

Office Action of China Counterpart Application, with English translation thereof, dated Nov. 24, 2020, pp. 1-20.
(Continued)

*Primary Examiner* — Mark T Monk
(74) *Attorney, Agent, or Firm* — JCIPRNET

(57) ABSTRACT

An image capturing apparatus includes: an image sensor that outputs an image signal obtained by image capturing by an imaging device, the imaging device performing image capturing of a photographic subject through an image capturing optical system; a display that displays a captured image based on the image signal; and a processor configured to determine, on the basis of a result of analysis of the captured image, a position of a boundary line along which the captured image is divided into a plurality of regions, adjust, in a case where a change occurs in the captured image, the determined position of the boundary line on the basis of the change in the captured image, and control, on the basis of a brightness of the captured image after the change, an exposure for at least one of the plurality of regions separated by the adjusted boundary line.

15 Claims, 16 Drawing Sheets

(51) Int. Cl.
H04N 5/225 (2006.01)
H04N 5/243 (2006.01)

(56) References Cited

U.S. PATENT DOCUMENTS

2002/0012064 A1 1/2002 Yamaguchi
2002/0047909 A1 4/2002 Hatae et al.
2013/0155276 A1 6/2013 Ueda

FOREIGN PATENT DOCUMENTS

| | | |
|---|---|---|
| CN | 104506780 | 4/2015 |
| CN | 105979162 | 9/2016 |
| CN | 106303250 | 1/2017 |
| CN | 106791475 | 5/2017 |
| JP | H09214827 | 8/1997 |
| JP | 2001333329 | 11/2001 |
| JP | 2002204391 | 7/2002 |
| JP | 2008072337 | 3/2008 |
| JP | 2011130167 | 6/2011 |

OTHER PUBLICATIONS

"International Search Report (Form PCT/ISA/210) of PCT/JP2018/014269", dated Jun. 19, 2018, with English translation thereof, pp. 1-4.
"Written Opinion of the International Searching Authority (Form PCT/ISA/237) of PCT/JP2018/014269", dated Jun. 19, 2018, with English translation thereof, pp. 1-9.

* cited by examiner

FINE ADJUSTMENT (MOVE)

IMAGE CAPTURING APPARATUS, CONTROL METHOD FOR IMAGE CAPTURING APPARATUS, AND CONTROL PROGRAM FOR IMAGE CAPTURING APPARATUS

CROSS-REFERENCE TO RELATED APPLICATIONS

This application is a Continuation of PCT international Application No. PCT/JP 2018/014269 filed on Apr. 3, 2018, which claims priority under 35 U.S.C. § 119(a) to Japanese Patent Application No. 2017-121443 filed on Jun. 21, 2017. Each of the above application(s) is hereby expressly incorporated by reference, in its entirety, into the present application.

BACKGROUND OF THE INVENTION

1. Field of the Invention

A technique of the present disclosure relates to an image capturing apparatus, a control method for an image capturing apparatus, and a control program for an image capturing apparatus.

2. Description of the Related Art

For an image capturing apparatus in which image capturing of a photographic subject is performed by an imaging device through an image capturing optical system, a technique for performing image capturing through an ND (neutral density) filter is known. As a technique for attaining an effect equivalent to that attained by providing a physical ND filter in the image capturing optical system, a technique called a digital ND filter process (hereinafter simply referred to as "ND filter process") is known.

For a digital ND filter (hereinafter simply referred to as "ND filter") as described above, JP2011-130167A and JP2008-72337A disclose a technique for providing a gradation with which the density of an ND filter is changed with a gradient to control local exposure.

SUMMARY OF THE INVENTION

However, with JP2011-130167A and JP2008-72337A described above, in a case where a change occurs in a captured image, it may be difficult to set regions for which exposure is controlled.

The present disclosure has been made in view of the above-described circumstances, and an object thereof is to provide an image capturing apparatus, a control method for an image capturing apparatus, and a control program for an image capturing apparatus with which it is possible to easily set regions for which exposure is controlled.

To achieve the above-described object, an image capturing apparatus according to a first aspect of the present disclosure includes: an image sensor (hereinafter, referred to as an image capturing unit) that outputs an image signal obtained by image capturing by an imaging device, the imaging device performing image capturing of a photographic subject through an image capturing optical system; a display (hereinafter, referred to as a display unit) that displays a captured image based on the image signal; and a processor (hereinafter, referred to as a control unit) configured to determine, on the basis of a result of analysis of the captured image, a position of a boundary line along which the captured image is divided into a plurality of regions, adjust, in a case where a change occurs in the captured image, the determined position of the boundary line on the basis of the change in the captured image, and control, on the basis of a brightness of the captured image after the change, an exposure for at least one of the plurality of regions separated by the adjusted boundary line.

An image capturing apparatus according to a second aspect is the image capturing apparatus according to the first aspect in which the control unit is configured to control, for a region, among the plurality of regions, in which a brightness changes due to the change in the captured image, an exposure for the region in accordance with the brightness of the region after the change.

An image capturing apparatus according to a third aspect is the image capturing apparatus according to the first or second aspect in which the control unit is configured to adjust the position of the boundary line by moving the position of the boundary line at a rate corresponding to a rate or an acceleration of the change in the captured image.

An image capturing apparatus according to a fourth aspect is the image capturing apparatus according to any one of the first to third aspects in which the control unit is configured to perform control to gradually change an exposure of a boundary region including the boundary line in the captured image.

An image capturing apparatus according to a fifth aspect is the image capturing apparatus according to the fourth aspect in which the control unit is configured to make a degree to which the exposure is changed differ depending on the rate of the change in the captured image.

An image capturing apparatus according to a sixth aspect is the image capturing apparatus according to the fifth aspect in which the control unit is configured to decrease the degree to which the exposure is changed as the rate of the change in the captured image increases.

An image capturing apparatus according to a seventh aspect is the image capturing apparatus according to the fourth aspect in which the control unit is configured to determine a width of the boundary region in accordance with the rate of the change in the captured image.

An image capturing apparatus according to an eighth aspect is the image capturing apparatus according to the fourth aspect in which the control unit is configured to make a direction in which the exposure is changed differ depending on an orientation of the change in the captured image.

An image capturing apparatus according to a ninth aspect is the image capturing apparatus according to the fourth aspect in which the control unit is configured to determine a width of the boundary region in accordance with an orientation of the change in the captured image.

An image capturing apparatus according to a tenth aspect is the image capturing apparatus according to any one of the first to ninth aspects in which the control unit is configured to estimate the position of the boundary line after the change in accordance with the change in the captured image and adjust the position of the boundary line to the estimated position.

A control method for an image capturing apparatus according to an eleventh aspect includes a process including: displaying, on a display unit, a captured image based on an image signal obtained by image capturing by an imaging device, the imaging device performing image capturing of a photographic subject through an image capturing optical system; determining, on the basis of a result of analysis of the captured image, a position of a boundary line along which the captured image is divided into a plurality of regions; adjusting, in a case where a change occurs in the captured image, the determined position of the boundary line on the basis of the change in the captured image; and controlling, on the basis of a brightness of the captured image after the change, an exposure for at least one of the plurality of regions separated by the adjusted boundary line.

A control program for an image capturing apparatus according to a twelfth aspect causes a computer to perform a process including: displaying, on a display unit, a captured image based on an image signal obtained by image capturing by an imaging device, the imaging device performing image capturing of a photographic subject through an image capturing optical system; determining, on the basis of a result of analysis of the captured image, a position of a boundary line along which the captured image is divided into a plurality of regions; adjusting, in a case where a change occurs in the captured image, the determined position of the boundary line on the basis of the change in the captured image; and controlling, on the basis of a brightness of the captured image after the change, an exposure for at least one of the plurality of regions separated by the adjusted boundary line.

According to the present disclosure, it is possible to easily set regions for which exposure is controlled.

DESCRIPTION OF THE PREFERRED EMBODIMENTS

Hereinafter, example embodiments of the technique of the present disclosure will be described in detail with reference to the drawings.

First Embodiment

Figure 1:
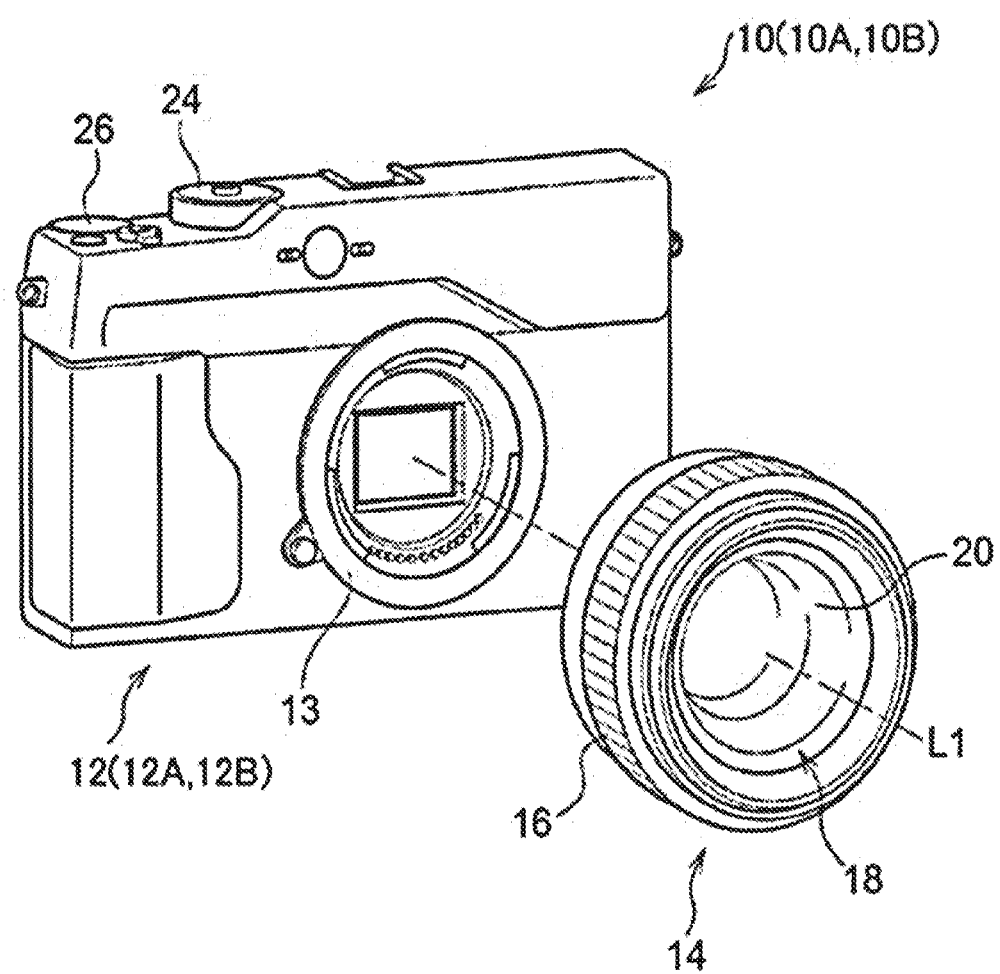
FIG. 1 is a perspective view illustrating an example external appearance of an image capturing apparatus according to first to third embodiments.

First, an example configuration of an image capturing apparatus 10 of this embodiment will be described with reference to FIG. 1 to FIG. 3. As illustrated in FIG. 1, for example, the image capturing apparatus 10 of this embodiment is an interchangeable-lens digital camera and includes an image capturing apparatus main body 12 and an image capturing lens 14.

The image capturing lens 14 is attached to the image capturing apparatus main body 12 so as to be interchangeable. On the lens barrel of the image capturing lens 14, a focus ring 16 that is used in a manual focus mode is provided. The image capturing lens 14 includes a lens unit 18. The lens unit 18 of this embodiment is an example of an image capturing optical system of the present disclosure.

The lens unit 18 is a combination lens in which a plurality of lenses including a focus lens 20 are combined. The focus lens 20 moves in the direction of an optical axis L1 in accordance with a manual rotation operation of the focus ring 16, and photographic subject light, which is reflected light representing a photographic subject, forms an image on a photosensitive surface 22A of an imaging device 22 (see FIG. 3) described below at an in-focus position corresponding to the distance to the photographic subject.

On the top surface of the image capturing apparatus main body 12, a dial 24 and a release button 26 are provided. The dial 24 is operated for various settings, such as switching between an image capture mode and a playback mode. Accordingly, in the image capturing apparatus 10, when the dial 24 is operated by the user, the image capture mode or the playback mode is selectively set as an operation mode.

As the operation mode for image capturing, the image capturing apparatus 10 has a still-image capture mode and a moving-image capture mode. The still-image capture mode is an operation mode for recording a still image obtained by image capturing of a photographic subject by the image capturing apparatus 10. The moving-image capture mode is an operation mode for recording a moving image obtained by image capturing of a photographic subject by the image capturing apparatus 10.

The release button 26 is configured to be capable of detecting a depressing operation in two stages, that is, an image capture preparation instruction state and an image capture instruction state. The image capture preparation instruction state refers to a state where, for example, the release button 26 is depressed from a standby position to an intermediate position (a half-push position), and the image capture instruction state refers to a state where the release button 26 is depressed to a final depress position (full-push position) beyond the intermediate position. Hereinafter, the "state where the release button 26 is depressed from the standby position to the half-push position" is called "half-push state", and the "state where the release button 26 is depressed from the standby position to the full-push position" is called "full-push state".

In an autofocus mode, when the release button 26 is set the half-push state, image capture conditions are adjusted, and thereafter, when the release button 26 is subsequently set to the full-push state, actual exposure is performed. That is, when the release button 26 is set to the half-push state, an AE (auto-exposure) function is activated and the exposure state is set, and thereafter, an AF (autofocus) function is activated and in-focus control is performed. When the release button 26 is set to the full-push state, image capturing is performed.

Figure 2:
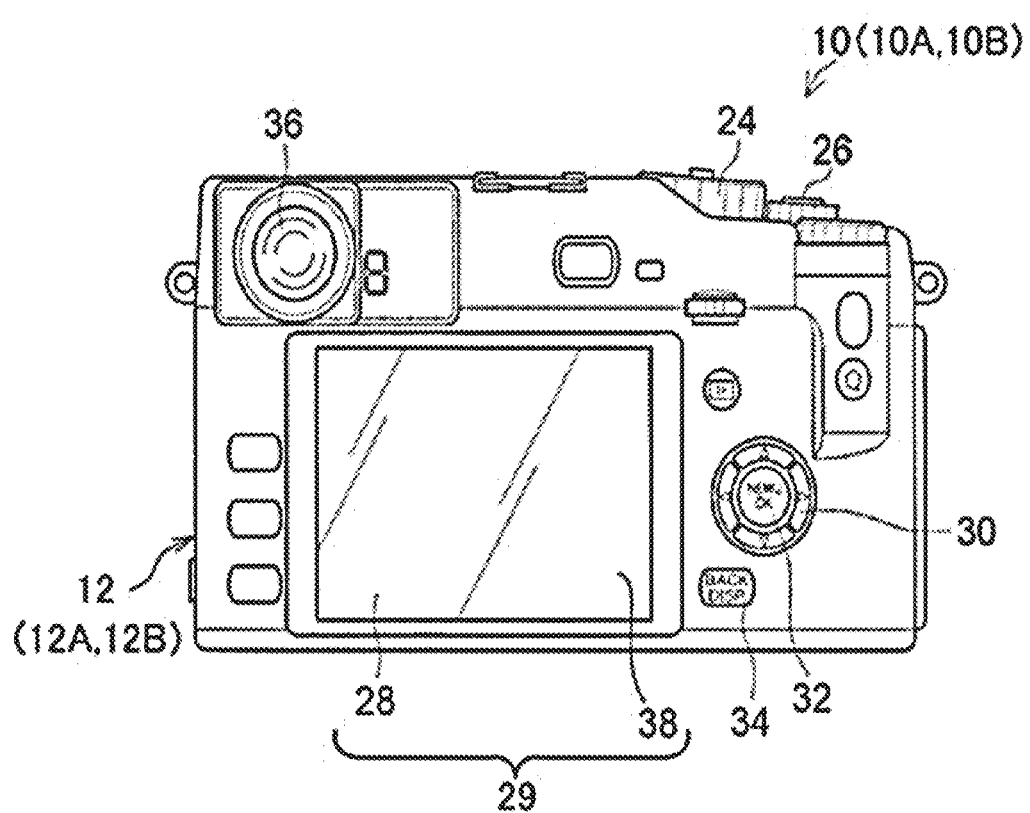
FIG. 2 is a rear view illustrating an example external appearance of the rear surface side of the image capturing apparatus according to the first to third embodiments.

As illustrated in FIG. 2, for example, on the rear surface of the image capturing apparatus main body 12, a display 28, a cross key 30, a MENU/OK key 32, a BACK/DISP button 34, a viewfinder 36, and a touch panel 38 are provided.

The display 28 is, for example, an LCD (liquid crystal display) and displays an image obtained by image capturing of a photographic subject by the image capturing apparatus 10, text, and so on. The display 28 of this embodiment is an example of a display unit of the present disclosure. The display 28 of this embodiment and the touch panel 38 constitute a touch panel display 29. The display 28 is used to display a live preview image in the image capture mode. The live preview image is also called a through-image and is a series of frame images obtained by the imaging device 22 of the image capturing apparatus 10 performing image capturing of a photographic subject as a series of frames. In a case where an instruction for still-image capturing is given, the display 28 is used to also display a still image obtained by single-frame image capturing. Further, the display 28 is used to also display a playback image in the playback mode, a menu screen, and so on.

On the surface of a display region of the display 28, the touch panel 38 of a transparent type is overlaid. The touch panel 38 senses, for example, a touch of an instructing object, such as a finger or a stylus pen. The touch panel 38 outputs, to a predetermined output destination (for example, a CPU (central processing unit) 74 described below, see FIG. 3), sensing result information indicating the sensing result, such as the presence or absence of a touch of an instructing object on the touch panel 38, at predetermined intervals of, for example, 100 milliseconds. In a case where the touch panel 38 senses a touch of an instructing object, the sensing result information includes two-dimensional coordinates (hereinafter referred to as "coordinates") with which the position at which the instructing object touches the touch panel 38 can be identified. In a case where the touch panel 38 does not sense a touch of an instructing object, the sensing result information does not include the coordinates.

The cross key 30 functions as a multifunction key for selecting one or more menus and for outputting instruction detail signals corresponding to various instructions including zooming, frame-by-frame playback, and so on. The MENU/OK key 32 is an operation key having both the function of a menu (MENU) button for giving an instruction for displaying one or more menus on the screen of the display 28 and the function of an accepting (OK) button for, for example, confirming a selection and giving an instruction for execution. The BACK/DISP button 34 is used in a case of, for example, erasing a desired target, such as a selected item, cancelling a specification, or returning to the previous operation state.

Figure 3:
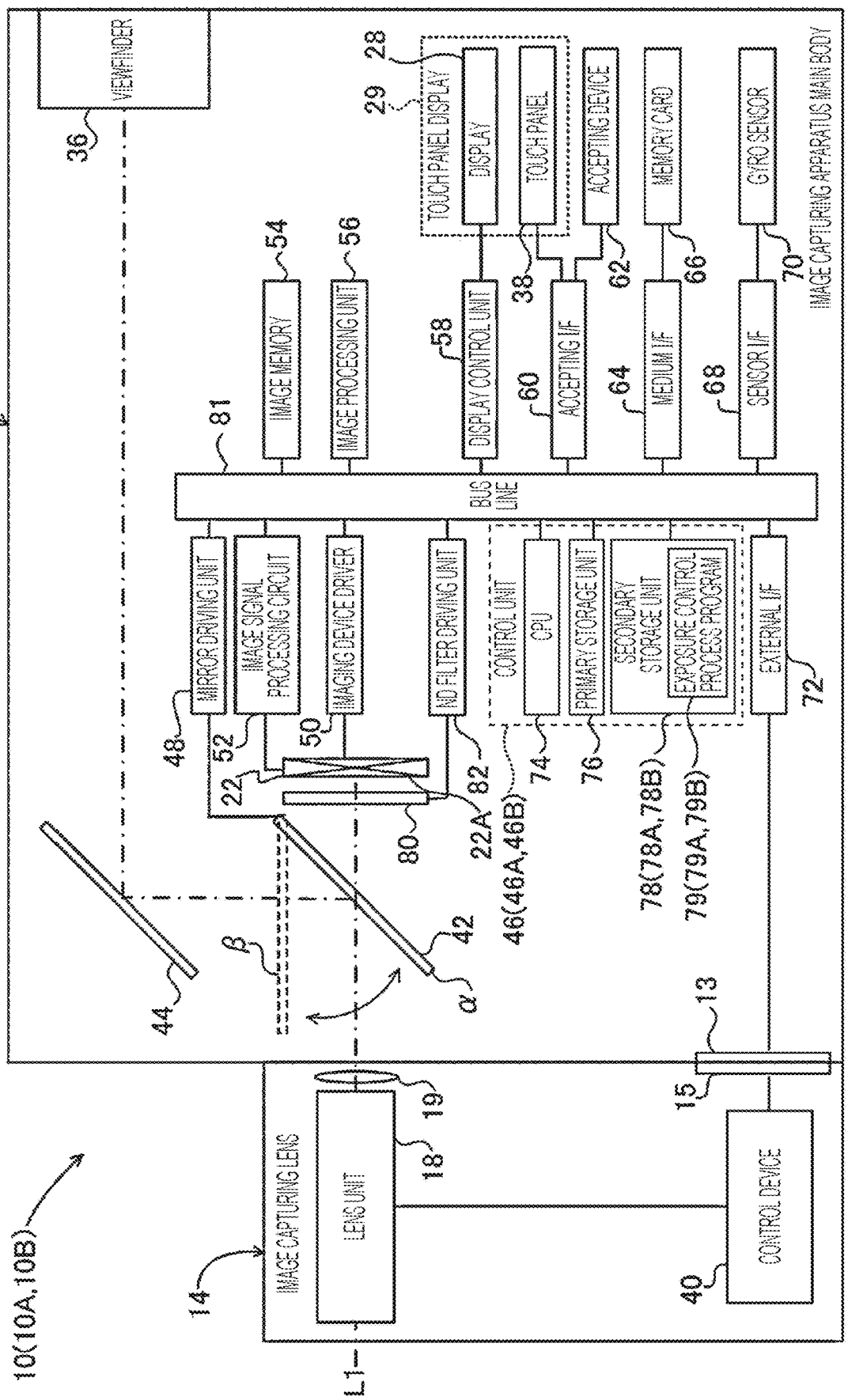
FIG. 3 is a block diagram illustrating an example hardware configuration of the image capturing apparatus according to the first to third embodiments.

FIG. 3 is a block diagram illustrating an example hardware configuration of the image capturing apparatus 10 according to the first embodiment.

As illustrated in FIG. 3, the image capturing apparatus main body 12 of this embodiment includes a mount 13 (see also FIG. 1), and the image capturing lens 14 includes a mount 15. When the mount 15 is coupled with the mount 13, the image capturing lens 14 is attached to the image capturing apparatus main body 12 so as to be interchangeable.

The image capturing lens 14 includes the lens unit 18 described above, an aperture diaphragm 19, and a control device 40. When the mount 15 is connected with the mount 13, the control device 40 is electrically connected to the CPU 74 through an external I/F (interface) 72 of the image capturing apparatus main body 12 to control the image capturing lens 14 as a whole in accordance with instructions from the CPU 74.

The aperture diaphragm 19 is provided on the image capturing apparatus main body 12 side relative to the lens unit 18. To the aperture diaphragm 19, a diaphragm driving unit and a diaphragm driving motor not illustrated are connected. The diaphragm driving unit is controlled by the control device 40 to operate the diaphragm driving motor in accordance with an instruction accepted by an accepting device 62 described below to adjust the size of the aperture of the aperture diaphragm 19, thereby adjusting the amount of photographic subject light that has passed though the lens unit 18 and guiding the photographic subject light into the image capturing apparatus main body 12.

As illustrated in FIG. 3, the image capturing apparatus main body 12 of this embodiment includes the imaging device 22, a first mirror 42, a second mirror 44, a control unit 46, a mirror driving unit 48, an imaging device driver 50, an image signal processing circuit 52, an image memory 54, an image processing unit 56, a display control unit 58, an ND (neutral density) filter 80, and an ND filter driving unit 82. The image capturing apparatus main body 12 further includes the touch panel display 29, an accepting I/F 60, the accepting device 62, a medium 64, a sensor I/F 68, a gyro sensor 70, and the external I/F 72.

The control unit 46 is an example of a computer in the technique of the present disclosure and includes the CPU 74, a primary storage unit 76, and a secondary storage unit 78. The CPU 74 controls the image capturing apparatus 10 as a whole. The primary storage unit 76 is a volatile memory that is used as a work area and so on when various programs are executed. Examples of the primary storage unit 76 include a RAM (random access memory). The secondary storage unit 78 of this embodiment is a nonvolatile memory that stores in advance various programs including an exposure control process program 79 described in detail below, various parameters, and so on. Examples of the secondary storage unit 78 include an EEPROM (electrically erasable programmable read-only memory) and a flash memory.

The CPU 74, the primary storage unit 76, and the secondary storage unit 78 are connected to a bus line 81. The mirror driving unit 48, the imaging device driver 50, the image signal processing circuit 52, and the ND filter driving unit 82 are also connected to the bus line 81. The image memory 54, the image processing unit 56, the display control unit 58, the accepting I/F 60, the medium I/F 64, the sensor I/F 68, and the external I/F 72 are also connected to the bus line 81.

The first mirror 42 is interposed between the photosensitive surface 22A of the imaging device 22 and the lens unit 18 and is a movable mirror that can be moved to a photosensitive surface cover position α and to a photosensitive surface open position β.

The first mirror 42 is connected to the mirror driving unit 48, and the mirror driving unit 48 is controlled by the CPU 74 to drive the first mirror 42 and place the first mirror 42 in the photosensitive surface cover position α or the photosensitive surface open position β in a selective manner. That is, in a case of not allowing the photosensitive surface 22A to receive photographic subject light, the first mirror 42 is placed in the photosensitive surface cover position α by the mirror driving unit 48, and in a case of allowing the photosensitive surface 22A to receive photographic subject light, the first mirror 42 is placed in the photosensitive surface open position β by the mirror driving unit 48.

In the photosensitive surface cover position α, the first mirror 42 covers the photosensitive surface 22A, and reflects and guides photographic subject light incoming from the lens unit 18 to the second minor 44. The second minor 44 reflects the photographic subject light guided by the first mirror 42 to thereby guide the photographic subject light to the viewfinder 36 through an optical system (not illustrated). The viewfinder 36 transmits the photographic subject light guided by the second mirror 44.

In the photosensitive surface open position β, the photosensitive surface 22A covered by the first mirror 42 is uncovered, and photographic subject light is received by the photosensitive surface 22A without reflected by the first mirror 42.

The ND filter 80 of this embodiment is an ND filter having a plurality of graduated light transmittances. The light transmittances of the ND filter 80 are not limited to those of this embodiment and, for example, the ND filter 80 may have a plurality of continuous light transmittances. The ND filter 80 of this embodiment is placed between the first mirror 42 in the photosensitive surface cover position α and the imaging device 22 on the optical axis L1. The ND filter 80 is connected to the ND filter driving unit 82. The CPU 74 changes a voltage to be applied to the ND filter 80 from the ND filter driving unit 82 to thereby control the light transmittance of the ND filter 80 in accordance with a predetermined resolution. The CPU 74 thus controls the light transmittance of the ND filter 80 to thereby control the exposure of a photographic subject image formed on the imaging device 22 from the lens unit 18 through the aperture diaphragm 19. The method for controlling the light transmittance is not limited to a control method in which a physical filter having a light transmittance that is variable for each region is used but may be a control method in which the amount of exposure or the amount of received light is controlled for each of the pixels in a corresponding region of the imaging device 22 in an individual manner.

The image capturing apparatus 10 of this embodiment employs a form in which the CPU 74 performs an exposure control process described in detail below in a case where an instruction is given by the user using the cross key 30 or the like from menus displayed on the display 28; however, the method for the user to give an instruction for performing the exposure control process is not specifically limited. For example, a form may be employed in which a dedicated button or the like for the user to give an instruction for the exposure control process is provided on the image capturing apparatus main body 12 and the dedicated button is used to give an instruction for performing the exposure control process.

The imaging device driver 50 is connected to the imaging device 22 and is controlled by the CPU 74 to supply a driving pulse to the imaging device 22. Each pixel of the imaging device 22 is driven in accordance with the driving pulse supplied by the imaging device driver 50. In this embodiment, a CCD (charge-coupled device) image sensor is used as the imaging device 22; however, the technique of the present disclosure is not limited to this. For example, another image sensor, such as a CMOS (complementary metal-oxide semiconductor) image sensor, may be used.

The image signal processing circuit 52 is controlled by the CPU 74 to read an image signal for one frame from each pixel of the imaging device 22. The image signal processing circuit 52 performs various types of processing including correlative double sampling processing, automatic gain control, and A/D (analog/digital) conversion for the read image signals. The image signal processing circuit 52 outputs digitized image signals obtained as a result of various type of processing performed for the image signals to the image memory 54 on a per frame basis at a specific frame rate (for example, several tens of frames/sec.) defined by a clock signal supplied from the CPU 74.

The imaging device 22 and the imaging device driver 50 of this embodiment correspond to an example of an image capturing unit of the present disclosure.

The image memory 54 temporarily retains image signals input from the image signal processing circuit 52.

The image processing unit 56 obtains image signals from the image memory 54 at a specific frame rate on a per frame basis and performs various types of processing including gamma correction, brightness conversion, color difference conversion, and compression on the obtained image signals. The image processing unit 56 outputs image signals obtained as a result of various types of processing to the display control unit 58 at a specific frame rate on a per frame basis. Further, the image processing unit 56 outputs the image signals obtained as a result of various types of processing to the CPU 74 in response to a request from the CPU 74.

The display control unit 58 is connected to the display 28 of the touch panel display 29 and is controlled by the CPU 74 to control the display 28. The display control unit 58 outputs image signals input from the image processing unit 56 to the display 28 at a specific frame rate on a per frame basis.

The display 28 displays an image represented by image signals input from the display control unit 58 at a specific frame rate as a live preview image. The display 28 also displays a still image, which is a single-frame image obtained by single-frame image capturing. On the display 28, a playback image, a menu screen, and so on are displayed in addition to a live preview image.

The accepting device 62 has the dial 24, the release button 26, the cross key 30, the MENU/OK key 32, the BACK/DISP button 34, and so on and accepts various instructions from the user.

The touch panel 38 of the touch panel display 29 and the accepting device 62 are connected to the accepting I/F 60 and output an instruction detail signal indicating the details of an accepted instruction to the accepting I/F 60. The accepting I/F 60 outputs the input instruction detail signal to the CPU 74. The CPU 74 performs a process in accordance with the instruction detail signal input from the accepting a 60.

To the medium I/F 64, a memory card 66 is connected so as to be detachable and re-attachable. The medium I/F 64 is controlled by the CPU 74 to record and read an image file to and from the memory card 66.

An image file read from the memory card 66 by the medium I/F 64 is subjected to decompression by the image processing unit 56 controlled by the CPU 74 and is displayed on the display 28 as a playback image.

In the image capturing apparatus 10, the operation mode is switched in accordance with an instruction accepted by the accepting device 62. In the image capturing apparatus 10, for example, in the image capture mode, the still-image capture mode and the moving-image capture mode are selectively set in accordance with an instruction accepted by the accepting device 62. In the still-image capture mode, a still-image file can be recorded to the memory card 66. In the moving-image capture mode, a moving-image file can be recorded to the memory card 66.

In a case where an instruction for capturing a still image given by using the release button 26 is accepted in the still-image capture mode, the CPU 74 controls the imaging device driver 50 to allow the imaging device 22 to be actually exposed for one frame. The image processing unit 56 is controlled by the CPU 74 to obtain image signals obtained as a result of the exposure for one frame, perform compression on the obtained image signals, and generate a still-image file in a specific still-image format. The specific still-image format is, for example, the JPEG (Joint Photographic Experts Group) format. The still-image file is recorded to the memory card 66 through the medium I/F 64 by the image processing unit 56 controlled by the CPU 74.

In a case where an instruction for capturing a moving image given by using the release button 26 is accepted in the moving-image capture mode, the image processing unit 56 performs compression on image signals for a live preview image and generates a moving-image file in a specific moving-image format. The specific moving-image format is, for example, the MPEG (Moving Picture Experts Group) format. The moving-image file is recorded to the memory card 66 through the medium OF 64 by the image processing unit 56 controlled by the CPU 74.

The gyro sensor 70 is connected to the sensor I/F 68, senses the angular velocity in each of the yaw direction, the roll direction, and the pitch direction, and outputs angular velocity information indicating the sensed angular velocities to the sensor I/F 68. The sensor I/F 68 outputs the angular velocity information input from the gyro sensor 70 to the CPU 74. The CPU 74 performs a process in accordance with the angular velocity information input from the sensor IN 68.

Next, as an operation of the image capturing apparatus 10 of this embodiment, an operation of the image capturing apparatus 10 to be performed in a case of performing the exposure control process of this embodiment will be described.

In the image capturing apparatus 10 of this embodiment, in the image capture mode, a live preview image is displayed on the touch panel display 29 as described above. In the image capturing apparatus 10 of this embodiment, the exposure control process for controlling the exposure of the live preview image displayed on the touch panel display 29 is performed.

Figure 4:
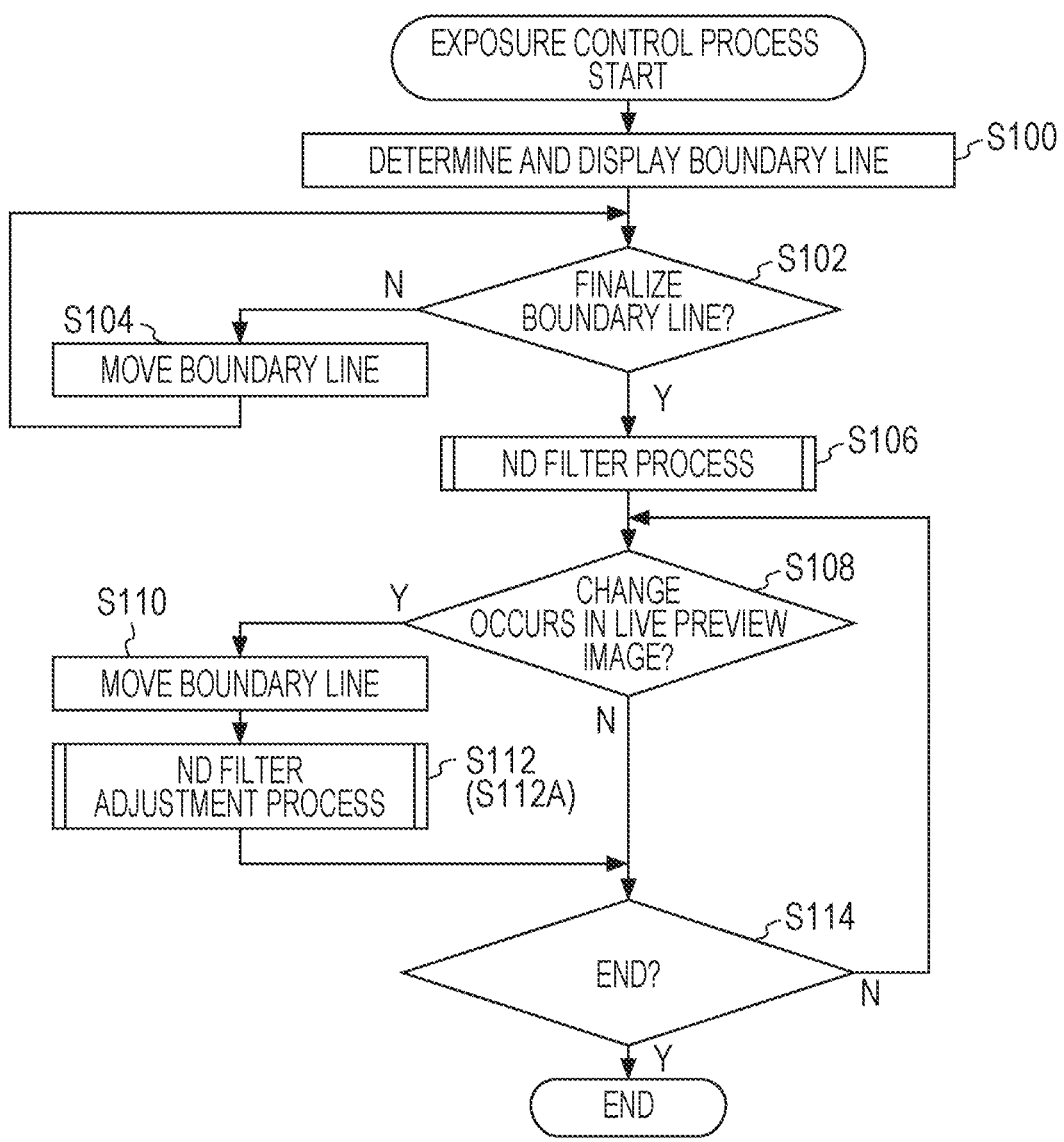
FIG. 4 is a flowchart illustrating an example flow of an exposure control process according to the first and second embodiments.

Specifically, in the image capture mode, when an instruction for performing the exposure control process is given by the user, the CPU 74 of the image capturing apparatus 10 of this embodiment reads from the secondary storage unit 78, loads to the primary storage unit 76, and executes the exposure control process program 79 to thereby perform the exposure control process, an example of which is illustrated in FIG. 4. The CPU 74 executes the exposure control process program 79 to thereby function as a control unit of the present disclosure.

Figure 5:
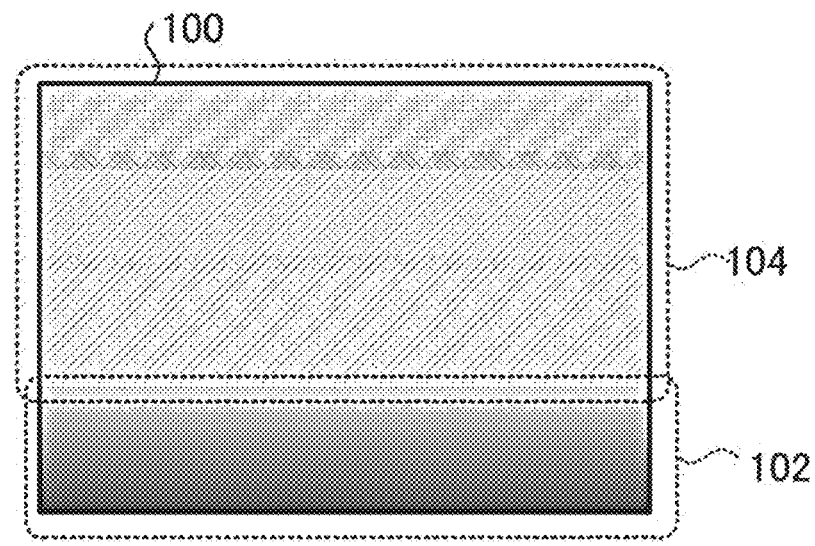
FIG. 5 is a diagram illustrating an example live preview image.

For convenience of description, a description is given below of a case where the exposure control process is performed for a live preview image 100, an example of which is illustrated in FIG. 5, displayed on the touch panel display 29. The live preview image 100 illustrated in FIG. 5 is the live preview image 100 obtained by capturing an image of "sea" and "sky", which are example photographic subjects, and includes a sea image 102 that mainly includes the sea and a sky image 104 that mainly includes the sky.

In the image capturing apparatus 10 of this embodiment, exposure is controlled for each of the plurality of regions set by dividing the live preview image 100 along a boundary line. In other words, the CPU 74 of this embodiment controls exposure for each of the regions obtained by dividing the live preview image 100 along a boundary line.

For this, first, in step S100 in FIG. 4, the CPU 74 performs an image analysis of the live preview image 100, determines the position of a boundary line for setting regions for which exposure is controlled, and causes the boundary line to be displayed in the determined position on the live preview image 100 displayed on the touch panel display 29.

Figure 6:
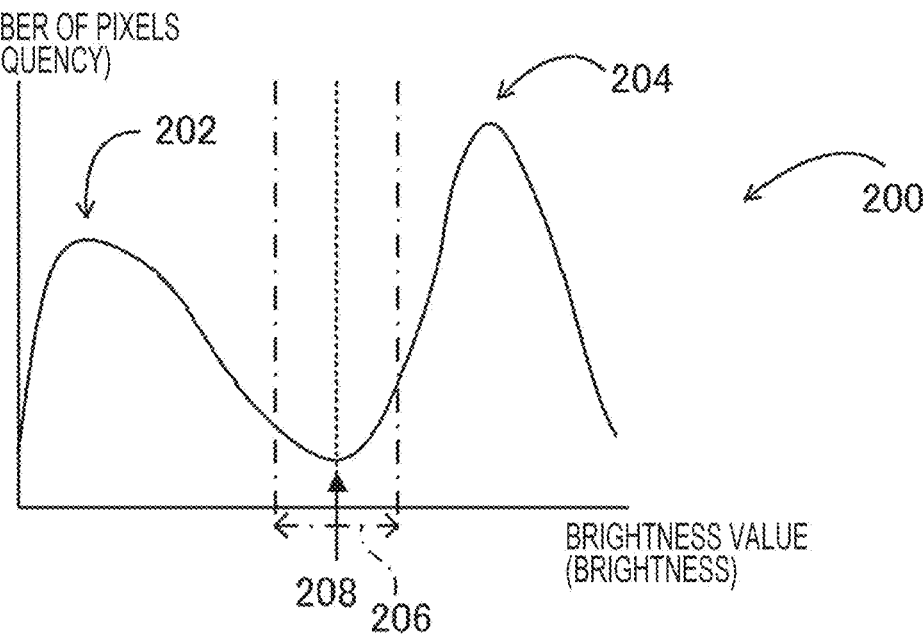
FIG. 6 is a diagram illustrating an example histogram of a live preview image.

The method for determining the position of the boundary line by the CPU 74 is not specifically limited. For example, the CPU 74 may determine the position of the boundary line on the basis of a histogram (brightness distribution) obtained as a result of the image analysis of the live preview image 100. For example, a histogram 200 of the live preview image 100 is illustrated in FIG. 6. The histogram 200 illustrated in FIG. 6 represents the brightness distribution of the live preview image 100 where the horizontal axis represents the brightness value (brightness) and the vertical axis represents the number of pixels (frequency). Hereinafter, "brightness value" may be simply referred to as "brightness".

The CPU 74 detects a range 206 that corresponds to a valley between a peak 202 and a peak 204 of the brightness value from the histogram 200 and determines one specific brightness value 208 in the detected range 206 on the basis of a predetermined condition. In the predetermined condition in this case, for example, the intermediate value in the range 206 or a brightness value for which the number of pixels is smallest is specified as the brightness value to be determined. On the basis of the positions of pixels corresponding to the determined brightness value 208, the CPU 74 sets a straight line that includes the largest number of pixels having a brightness value equal to the brightness value 208 as a boundary line 120 in the live preview image 100 to thereby determine the position of the boundary line 120 in the live preview image 100.

The case has been described where the histogram 200 illustrated in FIG. 6 has two portions (the peak 202 and the peak 204) that correspond to peaks of the brightness value; however, even in a case where the histogram 200 has three or more portions that correspond to peaks of the brightness value, that is, has two or more ranges 206 that correspond to valleys, the CPU 74 can determine the position of the boundary line 120 from the histogram. In this case, for example, the CPU 74 determines, from among brightness values determined from the respective ranges 206 that correspond to the plurality of valleys, a brightness value that meets a predetermined condition specifying, for example, the smallest value, and determine the position of the boundary line 120 on the basis of the determined brightness value.

Another method for determining the position of the boundary line 120 may be employed in which contrasts are sequentially extracted from an end portion of the live preview image 100 on the basis of the brightness or density, and a position in which the contrast suddenly changes is determined to be the position of the boundary line 120.

Figure 7:
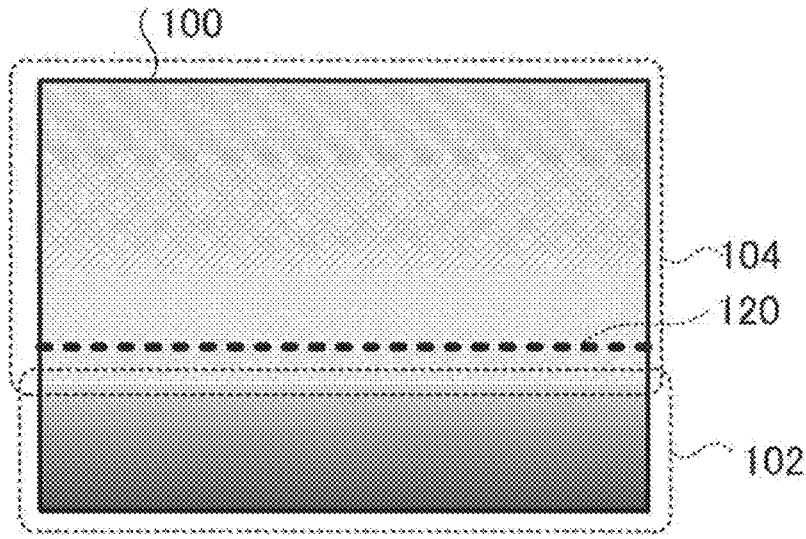
FIG. 7 is a diagram illustrating an example live preview image in a state where a boundary line is displayed in a position determined by a CPU of the image capturing apparatus.

FIG. 7 illustrates an example state where the boundary line 120 is displayed on the live preview image 100. When the CPU 74 thus displays the boundary line 120, the user can check the position of the boundary line 120, that is, regions for which exposure is controlled.

In the next step S102, the CPU 74 determines whether to finalize the position of the boundary line 120. There may be a case where the position of the boundary line 120 determined by the CPU 74 in step S100 described above is not appropriate or there may be a case where the user wants to adjust regions for which exposure is controlled as desired. In such cases, in the image capturing apparatus 10 of this embodiment, a fine adjustment to the position of the boundary line 120 is allowed in accordance with a specification given by the user.

Figure 8A:
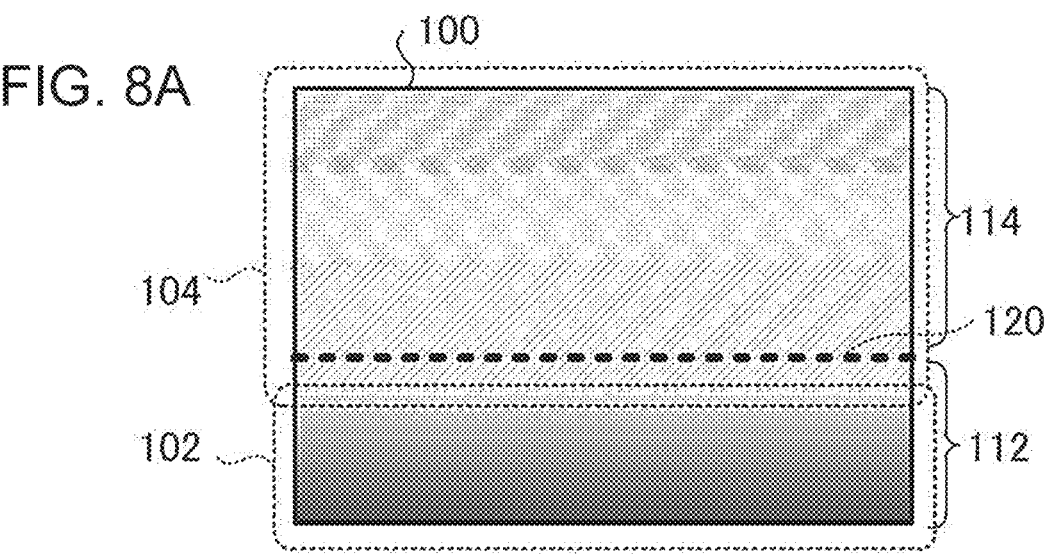
FIGS. 8A to 8C are diagrams for explaining an example fine adjustment made to a boundary line.

For example, FIG. 8A illustrates the live preview image 100 on which the boundary line 120 is displayed in the position determined by the CPU 74 as in FIG. 7 described above and in which a region 114 obtained by division along the boundary line 120 includes only the sky image 104 and a region 112 obtained by division along the boundary line 120 includes the sea image 102 and the sky image 104.

In such a case, when the user makes a fine adjustment to the position of the boundary line 120, the state can be changed so that, for example, the region 112 includes only the sea image 102 and the region 114 includes only the sky image 104.

Accordingly, in this embodiment, in a case where the touch panel display 29 accepts an instruction for making a fine adjustment to the position of the boundary line 120, the position of the boundary line 120 is not yet finalized, and therefore, the result of determination in step S102 is negative, and the flow proceeds to step S104.

The method for making a fine adjustment to the position of the boundary line by the user is not specifically limited; however, in this embodiment, for example, a fine adjustment is made by the user pointing the boundary line 120 displayed on the touch panel display 29 with an instructing object and moving the instructing object to a desired position on the live preview image 100 to specify the position of the boundary line 120.

Accordingly, in the next step S104, the CPU 74 moves the position of the boundary line 120 to a position corresponding to the coordinates of the position specified by the user, the coordinates being included in sensing result information input from the touch panel 38, and thereafter, the flow returns to step S102.

Figure 8B:
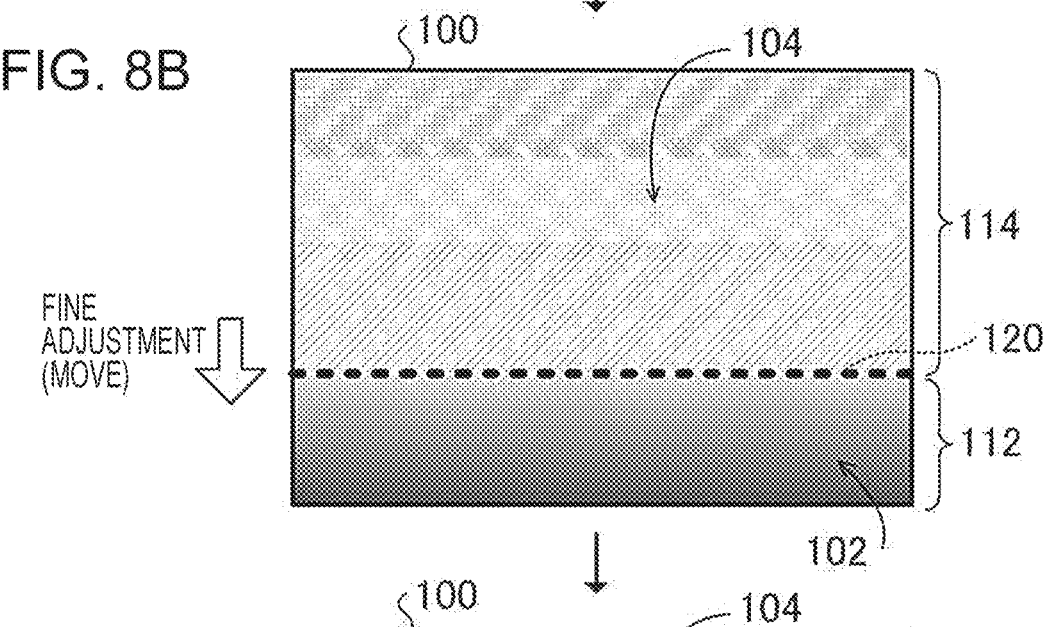

FIG. 8B illustrates an example state where a fine adjustment has been made to the position of the boundary line 120 by the user. The case illustrated in FIG. 8B corresponds to a state where the region 112 separated by the boundary line 120 includes only the sea image 102 and the region 114 includes only the sky image 104.

On the other hand, in the image capturing apparatus 10 of this embodiment, for example, in a case where the accepting device 62 accepts, from the user, an instruction for finalizing the position of the boundary line 120, the CPU 74 determines that the position of the boundary line 120 is finalized, the result of determination in step S102 is positive, and the flow proceeds to step S106.

Figure 9:
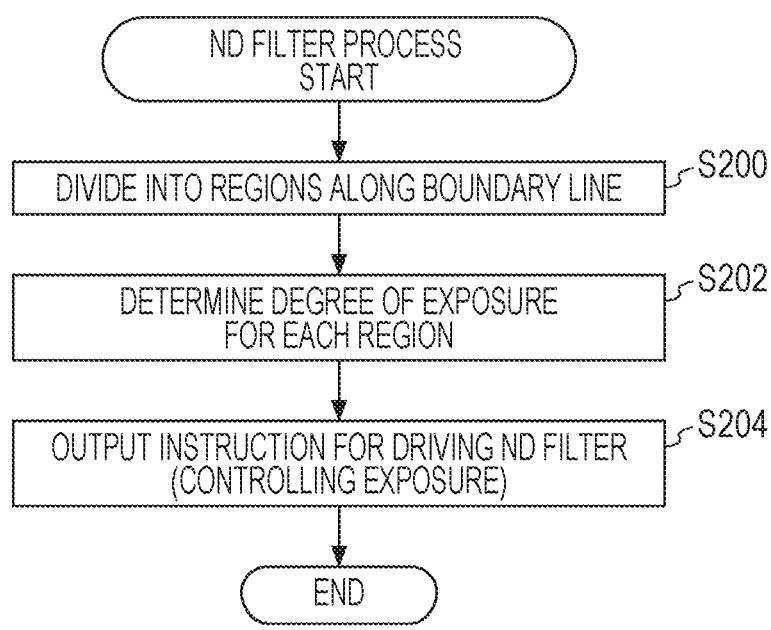
FIG. 9 is a flowchart illustrating an example flow of an ND filter process according to the first embodiment.

In step S106, the CPU 74 performs an ND filter process, an example of which is illustrated in FIG. 9, for controlling exposure for the region 112 and the region 114 set on the basis of the boundary line 120.

In step S200 in FIG. 9, the CPU 74 divides the live preview image 100 into the region 112 and the region 114 along the boundary line 120.

In the next step S202, the CPU 74 derives the degree of the ND filter 80 for each of the region 112 and the region 114. In other words, in step S202, the CPU 74 derives the filter factor of the ND filter 80. The degree of the ND filter 80 is an example of the degree to which exposure is controlled. In this embodiment, as the degree of the ND filter 80 increases, the ND filter process is more effective, and the light transmittance of the ND filter 80 decreases. Accordingly, the degree to which exposure is controlled increases. In this case, a blown-out-highlights prevention effect is enhanced. In this embodiment, as the degree of the ND filter 80 decreases, the ND filter process is less effective, and the light transmittance of the ND filter 80 increases. Accordingly, the degree to which exposure is controlled decreases. In this case, a blocked-up-shadows prevention effect is enhanced.

The method for deriving the degree of the ND filter 80 by the CPU 74 is not specifically limited. For example, the CPU 74 may derive the degree of the ND filter 80 on the basis of the brightness of each of the region 112 and the region 114. In this case, for example, information indicating a correspondence between the brightness and the degree of the ND filter 80 may be stored in advance in the secondary storage unit 78, the average of brightness may be calculated for each of the region 112 and the region 114, and the degree of the ND filter 80 corresponding to the calculated average may be derived from the information indicating the correspondence and stored in the secondary storage unit 78. Alternatively, for example, the CPU 74 may accept the degree of the ND filter 80 from the user through the accepting device 62 for each of the region 112 and the region 114 to derive the degree of the ND filter 80 for each of the region 112 and the region 114.

In this embodiment, for example, the sky image 104 is brighter (higher in brightness) than the sea image 102. Therefore, for the region 114, the CPU 74 increases the degree of the ND filter 80 for making the light transmittance of the ND filter 80 lower than a predetermined reference to prevent blown-out highlights, and for the region 112, the CPU 74 decreases the degree of the ND filter 80 for making the light transmittance of the ND filter 80 higher than the predetermined reference to prevent blocked-up shadows.

In the next step S204, the CPU 74 outputs, to the ND filter driving unit 82, an instruction for controlling exposure by driving the ND filter 80 in accordance with the degrees of the ND filter 80 derived in step S202 described above, and thereafter, the ND filter process ends, and the flow proceeds to step S108 (see FIG. 4) in the exposure control process.

Figure 8C:
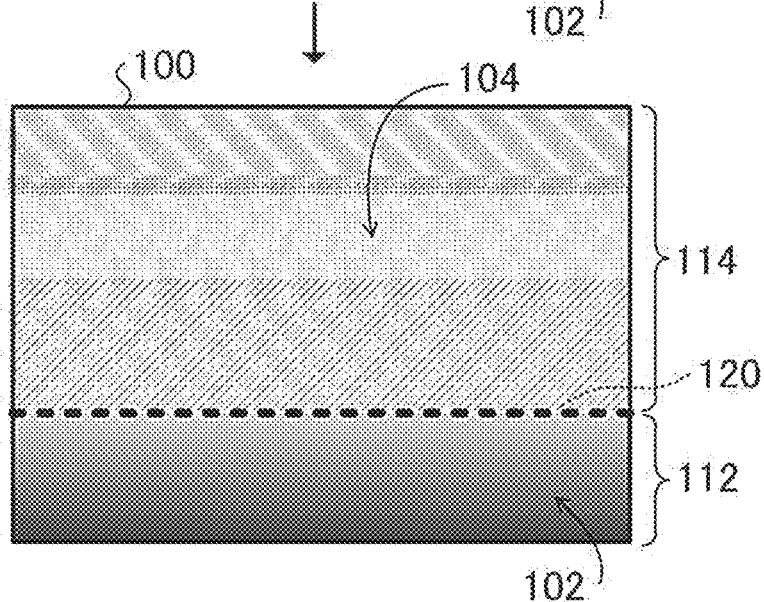

When the ND filter process, an example of which is illustrated in FIG. 9, is thus performed, the live preview image 100 displayed on the touch panel display 29 becomes an image, an example of which is illustrated in FIG. 8C, obtained while the degree of the ND filter 80 is controlled by the CPU 74 for each of the region 112 and the region 114.

In step S108, the CPU 74 determines whether a change occurs in the live preview image 100. In this embodiment, for example, the CPU 74 determines that a change occurs in the live preview image 100 in a case where angular velocities corresponding to angular velocity information input from the sensor I/F 68 exceed a predetermined threshold value.

A change in the live preview image 100 of this embodiment is an example of a change in a captured image of the present disclosure. A change in a captured image includes a change in the image capture scene, a change in an image of a photographic subject (image capture target) included in the captured image, a change in framing (angle of view), a change caused by enlargement, reduction, and so on, and a change in the image capture area. A change in a photographic subject includes a change in a natural phenomenon that is a photographic subject, such as sunrise or sunset and how light is reflected. Accordingly, a change in a captured image may occur not only in a case where the image capturing apparatus 10 moves but also in a case where the image capturing apparatus 10 does not move.

In a case where a change occurs in the live preview image 100, the result of determination in step S108 is positive, and the flow proceeds to step S110. In step S110, the CPU 74 moves the position of the boundary line 120 in accordance with the change in the live preview image 100.

The method for moving the boundary line 120 in accordance with a change in the live preview image 100 is not specifically limited. In this embodiment, the CPU 74 moves the boundary line 120 at a rate corresponding to the rate or acceleration of the change in the live preview image 100. As such a method, for example, the CPU 74 may use an image of a region that includes a portion of the boundary line 120 in the live preview image 100 before movement as a template image to perform template matching with the live preview image 100 after movement, thereby determining the position of the boundary line 120 and displaying the boundary line 120 in the determined position to move the boundary line 120. Alternatively, for example, the CPU 74 may derive optical flows of the boundary line 120 in the live preview image 100 before and after movement, thereby determining the position of the boundary line 120 and displaying the boundary line 120 in the determined position to move the boundary line 120. Further, for example, the CPU 74 may determine the position of the boundary line 120 in accordance with movement of the image capturing apparatus 10 sensed on the basis of the angular velocities in the respective directions sensed by the gyro sensor 70 (angular velocity information input from the sensor I/F 68) and display the boundary line 120 in the determined position to move the boundary line 120.

When the position of the boundary line 120 is thus moved, the region 112 and the region 114 become regions obtained as a result of division along the boundary line 120 after movement.

Figure 10:
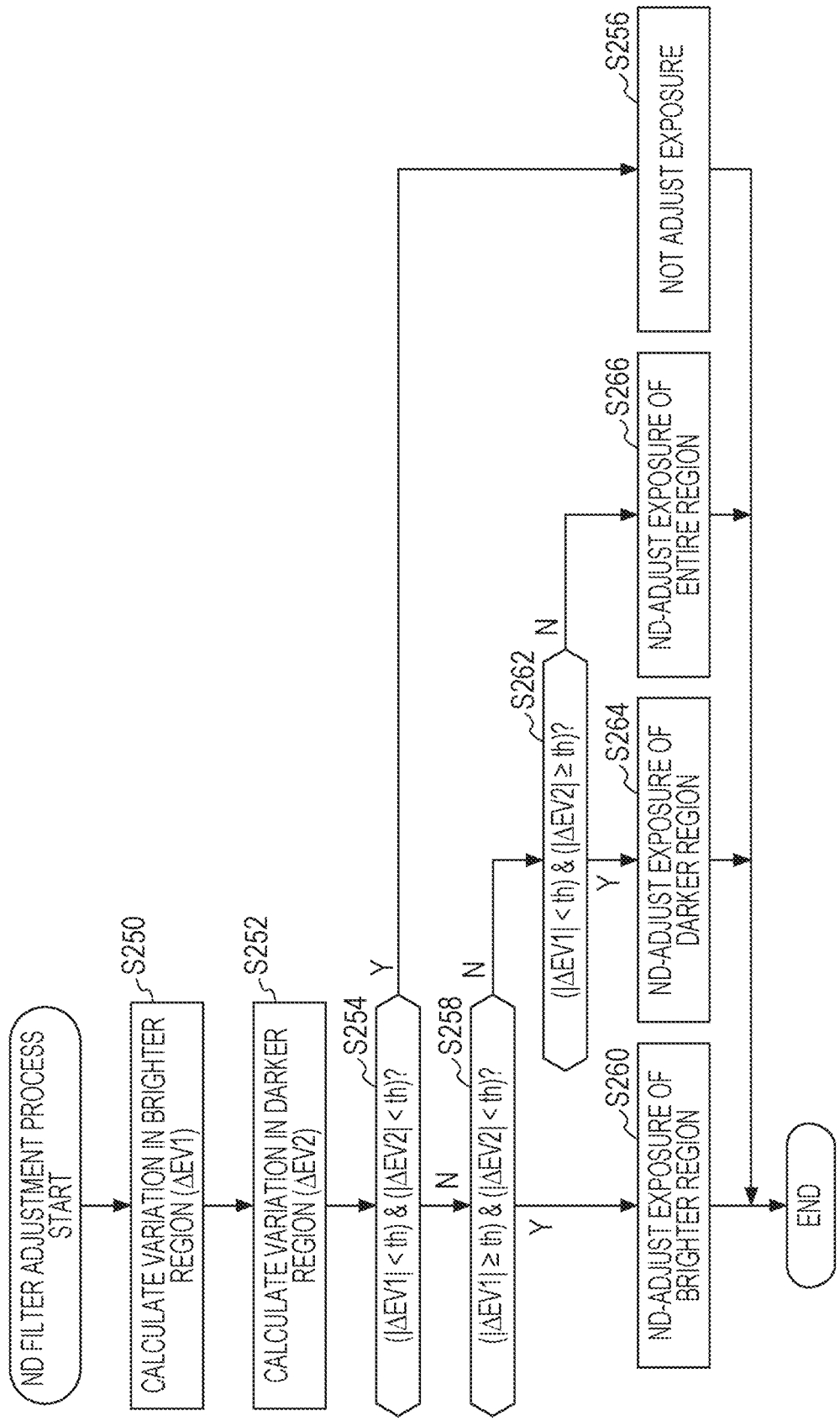
FIG. 10 is a flowchart illustrating an example flow of an ND filter adjustment process according to the first embodiment.

In the next step S112, the CPU 74 performs an ND filter adjustment process, an example of which is illustrated in FIG. 10, for adjusting the exposure of the region 112 and the region 114 to make the exposure suitable to the live preview image 100 after the change.

In step S250 in FIG. 10, the CPU 74 calculates a variation in the brightness for a brighter region among the region 112 and the region 114. In this embodiment, as described above, the region 114 is brighter than the region 112, and therefore, the CPU 74 first calculates the variation value of the brightness of the region 114. The calculated variation value is hereinafter referred to as "variation $\Delta EV1$".

In the next step S252, the CPU 74 calculates a variation in the brightness for a darker region among the region 112 and the region 114. In this embodiment, as described above, the region 112 is darker than the region 114, and therefore, the CPU 74 calculates the variation value of the brightness of the region 112. The calculated variation value is hereinafter referred to as "variation $\Delta EV2$".

In the next step S254, the CPU 74 determines whether a condition that the absolute value of the variation $\Delta EV1$ is smaller than a predetermined threshold value th and the absolute value of the variation $\Delta EV2$ is smaller than the predetermined threshold value th is satisfied. In the image capturing apparatus 10 of this embodiment, in a case where a change occurs in the live preview image 100 and the brightness changes to a large degree, the exposure is adjusted (the degree of the ND filter 80 is adjusted) for a region in which the brightness varies to a larger degree. As the threshold value th that is used to determine whether the brightness changes to a large degree, for example, a value obtained as a result of an experiment or the like may be stored in advance in the secondary storage unit 78 or a value specified by the user using the accepting device 62 or the like may be stored in advance in the secondary storage unit 78.

In a case where the condition that the absolute value of the variation $\Delta EV1$ is smaller than the predetermined threshold value th and the absolute value of the variation $\Delta EV2$ is smaller than the predetermined threshold value th is satisfied, the result of determination in step S254 is positive, and the flow proceeds to step S256.

In step S256, the CPU 74 decides not to adjust the exposure, that is, not to adjust the degree of the ND filter 80, and thereafter, the ND filter adjustment process ends.

On the other hand, in a case where the condition that the absolute value of the variation $\Delta EV1$ is smaller than the predetermined threshold value th and the absolute value of the variation $\Delta EV2$ is smaller than the predetermined threshold value th is not satisfied, that is, in a case where at least one of the absolute value of the variation $\Delta EV1$ or the absolute value of the variation $\Delta EV2$ is equal to or larger than the threshold value th, the result of determination in step S254 is negative, and the flow proceeds to step S258.

In step S258, the CPU 74 determines whether a condition that the absolute value of the variation $\Delta EV1$ is equal to or larger than the predetermined threshold value th and the absolute value of the variation $\Delta EV2$ is smaller than the predetermined threshold value th is satisfied. In a case where the condition that the absolute value of the variation $\Delta EV1$ is equal to or larger than the predetermined threshold value th and the absolute value of the variation $\Delta EV2$ is smaller than the predetermined threshold value th is satisfied, that is, in a case where the brightness of the region 114 varies to a large degree and the variation in brightness of the region 112 is not large (or the brightness does not vary), the result of determination in step S258 is positive, and the flow proceeds to step S260.

In step S260, the CPU 74 adjusts the exposure of the region 114, which is the brighter region, and thereafter, the ND filter adjustment process ends. In this embodiment, for example, as in step S202 in the ND filter process (see FIG. 9) described above, the CPU 74 derives the factor of the ND filter 80 for the region 114 in the live preview image 100 after the change. The CPU 74 outputs, to the ND filter driving unit 82, an instruction for controlling the exposure by driving the ND filter 80 in accordance with the derived degree of the ND filter 80 to adjust the exposure of the region 114. In this case, the exposure (the factor of the ND filter 80) of the region 112 remains the same as that determined in step S202 in the ND filter process (see FIG. 9) described above.

On the other hand, in a case where the condition that the absolute value of the variation ΔEV1 is equal to or larger than the predetermined threshold value th and the absolute value of the variation ΔEV2 is smaller than the predetermined threshold value th is not satisfied, the result of determination in step S258 is negative, and the flow proceeds to step S262.

In step S262, the CPU 74 determines whether a condition that the absolute value of the variation ΔEV1 is smaller than the predetermined threshold value th and the absolute value of the variation ΔEV2 is equal to or larger than the predetermined threshold value th is satisfied. In a case where the condition that the absolute value of the variation ΔEV1 is smaller than the predetermined threshold value th and the absolute value of the variation ΔEV2 is equal to or larger than the predetermined threshold value th is satisfied, the result of determination in step S262 is positive, and the flow proceeds to step S264. The case where the result of determination in step S262 is positive as described above is, in other words, a case where the brightness of only the darker regions varies to a large degree.

Accordingly, in step S264, the CPU 74 adjusts the exposure of the region 112, which is the darker region, and thereafter, the ND filter adjustment process ends. In this embodiment, for example, as in step S202 in the ND filter process (see FIG. 9) described above, the CPU 74 derives the factor of the ND filter 80 for the region 112 in the live preview image 100 after the change. The CPU 74 outputs, to the ND filter driving unit 82, an instruction for controlling the exposure by driving the ND filter 80 in accordance with the derived degree of the ND filter 80 to adjust the exposure of the region 112. In this case, the exposure (the factor of the ND filter 80) of the region 114 remains the same as that determined in step S202 in the ND filter process (see FIG. 9) described above.

On the other hand, in a case where the condition that the absolute value of the variation ΔEV1 is smaller than the predetermined threshold value th and the absolute value of the variation ΔEV2 is equal to or larger than the predetermined threshold value th is not satisfied, the result of determination in step S262 is negative, and the flow proceeds to step S266. The case where the result of determination in step S262 is negative as described above is, in other words, a case where the brightness of both the brighter region and the darker region varies to a large degree.

Accordingly, in step S266, the CPU 74 adjusts the exposure of each of the region 112 and the region 114, which constitute the entire region of the live preview image 100, and thereafter, the ND filter adjustment process ends. In this embodiment, for example, the CPU 74 performs the process in step S260 described above to adjust the exposure of the region 114 and performs the process in step S264 to adjust the exposure of the region 112.

When the ND filter adjustment process thus ends, the flow proceeds to step S114 (see FIG. 4) in the exposure control process.

On the other hand, also in a case where a change does not occur in the live preview image 100, the result of determination in step S108 described above is negative, and the flow proceeds to step S114.

In step S114, the CPU 74 determines whether to end the exposure control process. In a case where the exposure control process is not to be ended, the result of determination in step S114 is negative, the flow returns to step S108, and the process from step S108 to step S112 described above is repeated. On the other hand, in a case where the exposure control process is to be ended, the result of determination in step S114 is positive, and the exposure control process ends.

After the end of the exposure control process, when an instruction for image capturing is given by the user using the release button 26, an image obtained by image capturing by the imaging device 22 in a state where the exposure is controlled by the CPU 74 is recorded to the memory card 66.

As described above, the image capturing apparatus 10 of this embodiment includes the imaging device driver 50, the touch panel display 29, and the CPU 74. The imaging device driver 50 outputs image signals obtained by image capturing of a photographic subject by the imaging device 22 through the lens unit 18. The touch panel display 29 displays the live preview image 100 based on the image signals. The CPU 74 determines, on the basis of the result of analysis of the live preview image 100, the position of the boundary line 120 along which the live preview image 100 is divided into a plurality of regions, adjusts, in the case where a change occurs in the live preview image 100, the determined position of the boundary line 120 on the basis of the change in the live preview image 100, and controls, on the basis of the brightness of the live preview image 100 after the change, the exposure for at least one of the plurality of regions separated by the adjusted boundary line 120.

With the image capturing apparatus 10 of this embodiment, in the case where a change occurs in the live preview image 100 as described above, the CPU 74 adjusts the position of the boundary line 120 and controls, on the basis of the brightness of the live preview image 100 after the change, the exposure of the regions separated by the boundary line 120. Therefore, regions for which exposure is controlled can be easily set.

The position of the boundary line 120 moves in response to a change in the live preview image 100, and therefore, the user need not make a fine adjustment to the position of the boundary line 120 due to the change in the live preview image 100, which can suppress inconvenience to the user.

The case has been described where, in the image capturing apparatus 10 of this embodiment, a fine adjustment is made to the position of the boundary line 120, and thereafter, the ND filter process is performed on the basis of the boundary line 120 after the fine adjustment in the exposure control process (see FIG. 4) described above; however, this embodiment need not be employed. For example, the ND filter process may be performed for the live preview image 100 before a fine adjustment is made to the position of the boundary line 120.

Figure 11:
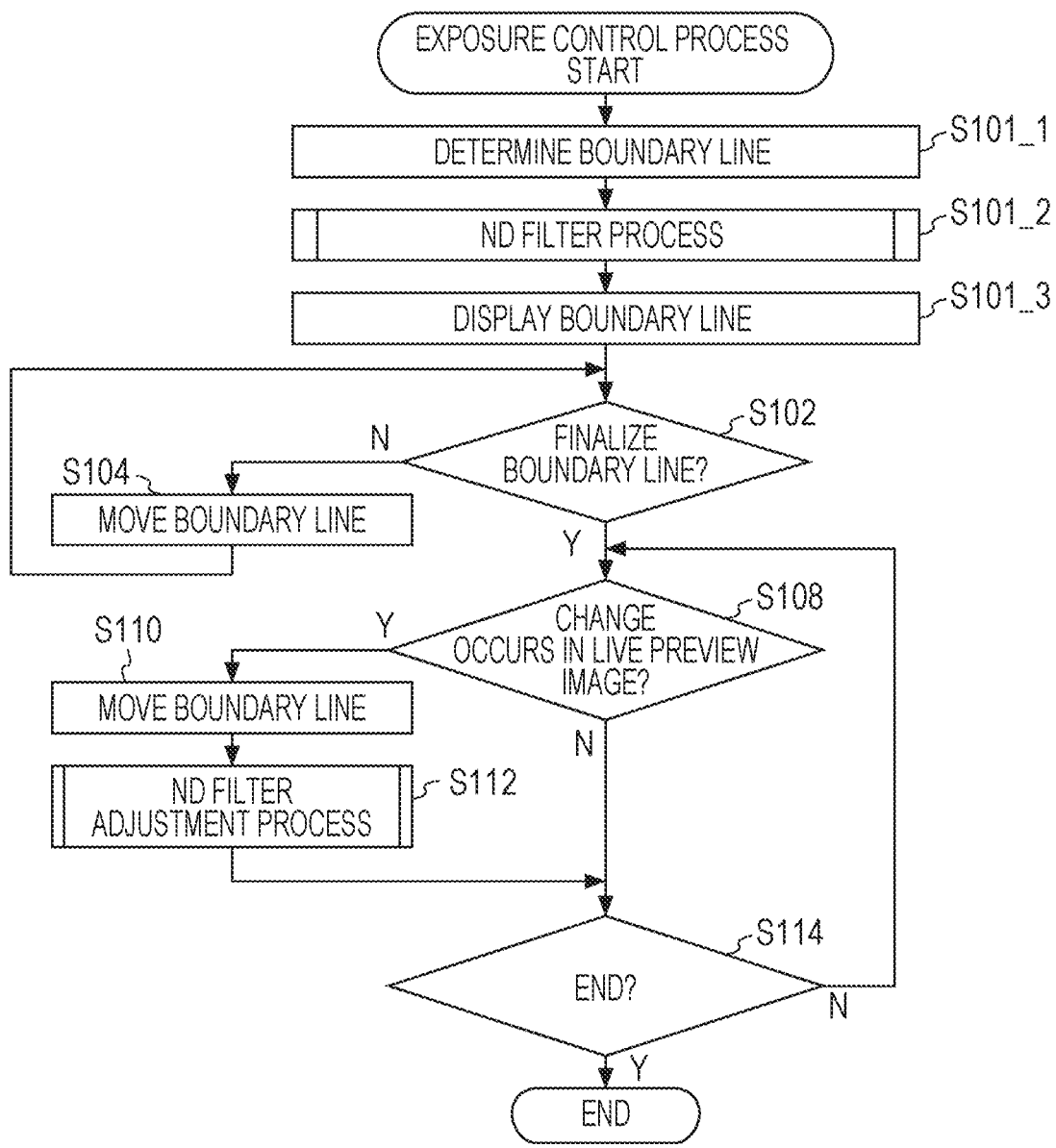
FIG. 11 is a flowchart illustrating another example flow of the exposure control process according to the first embodiment.

An example flowchart of the exposure control process in this case is illustrated in FIG. 11. In the exposure control process illustrated in FIG. 11, the process from step S101_1 to step S101_3 is performed instead of step S100 in the exposure control process illustrated in FIG. 4. Further, the ND filter process in step S106 is not performed, which is a difference from the exposure control process illustrated in FIG. 4.

In step S101_1 illustrated in FIG. 11, the CPU 74 performs an image analysis of the live preview image 100 and determines the position of a boundary line for setting regions for which exposure is controlled as in step S100 in the exposure control process illustrated in FIG. 4.

In the next step S101_2, the CPU 74 performs the ND filter process as in step S106 in the exposure control process illustrated in FIG. 4. When the CPU 74 thus performs the ND filter process, the live preview image 100 for which exposure is controlled is displayed on the touch panel display 29.

Figure 12A:
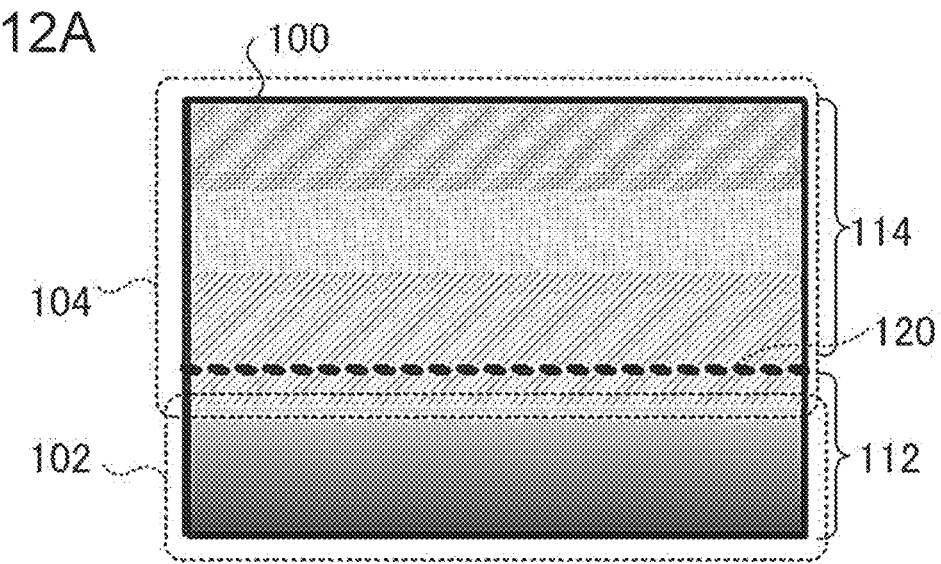
FIGS. 12A and 12B are diagrams for explaining an example fine adjustment made to a boundary line.
Figure 12B:
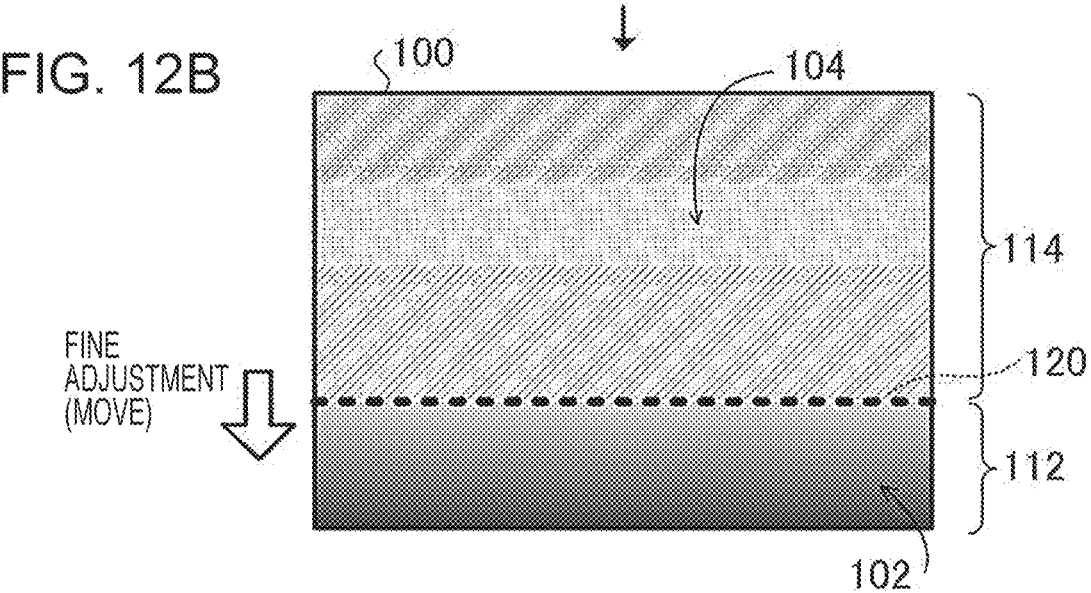

In the next step S101_3, the CPU 74 displays the boundary line 120 in the position determined in step S101_1 described above. FIG. 12A illustrates, for example, the live preview image 100 on which the boundary line 120 in this case is displayed.

Accordingly, in this case, as illustrated in 12B, the user can make a fine adjustment to the position of the boundary line 120 on the live preview image 100 for which exposure is controlled by the ND filter process. Therefore, the user can make a fine adjustment to the boundary line 120 while checking the effect of the ND filter 80.

Note that, as described above, in a case where the user makes a fine adjustment to the position of the boundary line 120 on the live preview image 100 for which the ND filter process is not yet performed, the user can make a fine adjustment to the image having a clear contrast.

Second Embodiment

In this embodiment, a form will be described in which, in the case where a change occurs in the live preview image 100, the state of a gradation with which the light transmittance density) of the ND filter 80 is gradually changed in a boundary region including a boundary line is controlled. That is, in this embodiment, the control unit performs control to gradually change an exposure of a boundary region including the coundary line in the captured image. In this embodiment, components the same as those described in the first embodiment described above are assigned the same reference numerals, and descriptions thereof will be omitted.

For example, as illustrated in FIG. 1 to FIG. 3, an image capturing apparatus 10A of this embodiment is different from the image capturing apparatus 10 of the first embodiment described above in that the image capturing apparatus 10A has an image capturing apparatus main body 12A instead of the image capturing apparatus main body 12.

For example, as illustrated in FIG. 3, the image capturing apparatus main body 12A is different from the image capturing apparatus main body 12 in that the image capturing apparatus main body 12A has a control unit 46A instead of the control unit 46. The control unit 46A is different from the control unit 46 in that the control unit 46A has a secondary storage unit 78A instead of the secondary storage unit 78.

For example, as illustrated in FIG. 3, the secondary storage unit 78A is different from the secondary storage unit 78 in that the secondary storage unit 78A stores an exposure control process program 79A instead of the exposure control process program 79. The CPU 74 reads from the secondary storage unit 78A and loads to the primary storage unit 76 the exposure control process program 79A, and performs the exposure control process illustrated in FIG. 4 in accordance with the loaded exposure control process program 79A. The CPU 74 executes the exposure control process program 79A to thereby function as the control unit of the present disclosure.

Now, as an operation of the image capturing apparatus 10A of this embodiment, the exposure control process illustrated in FIG. 4 will be described. For an operation the same as that in the first embodiment described above, a description thereof will be omitted.

As illustrated in FIG. 4, an exposure control process of this embodiment is different from the exposure control process of the first embodiment described above in that step S112A is performed instead of step S112. Specifically, step S112A in the exposure control process of this embodiment is different in that an ND filter adjustment process, an example of which is illustrated in FIG. 13, is performed instead of the ND filter adjustment process (see FIG. 10) in step S112 in the exposure control process of the first embodiment described above.

Figure 13:
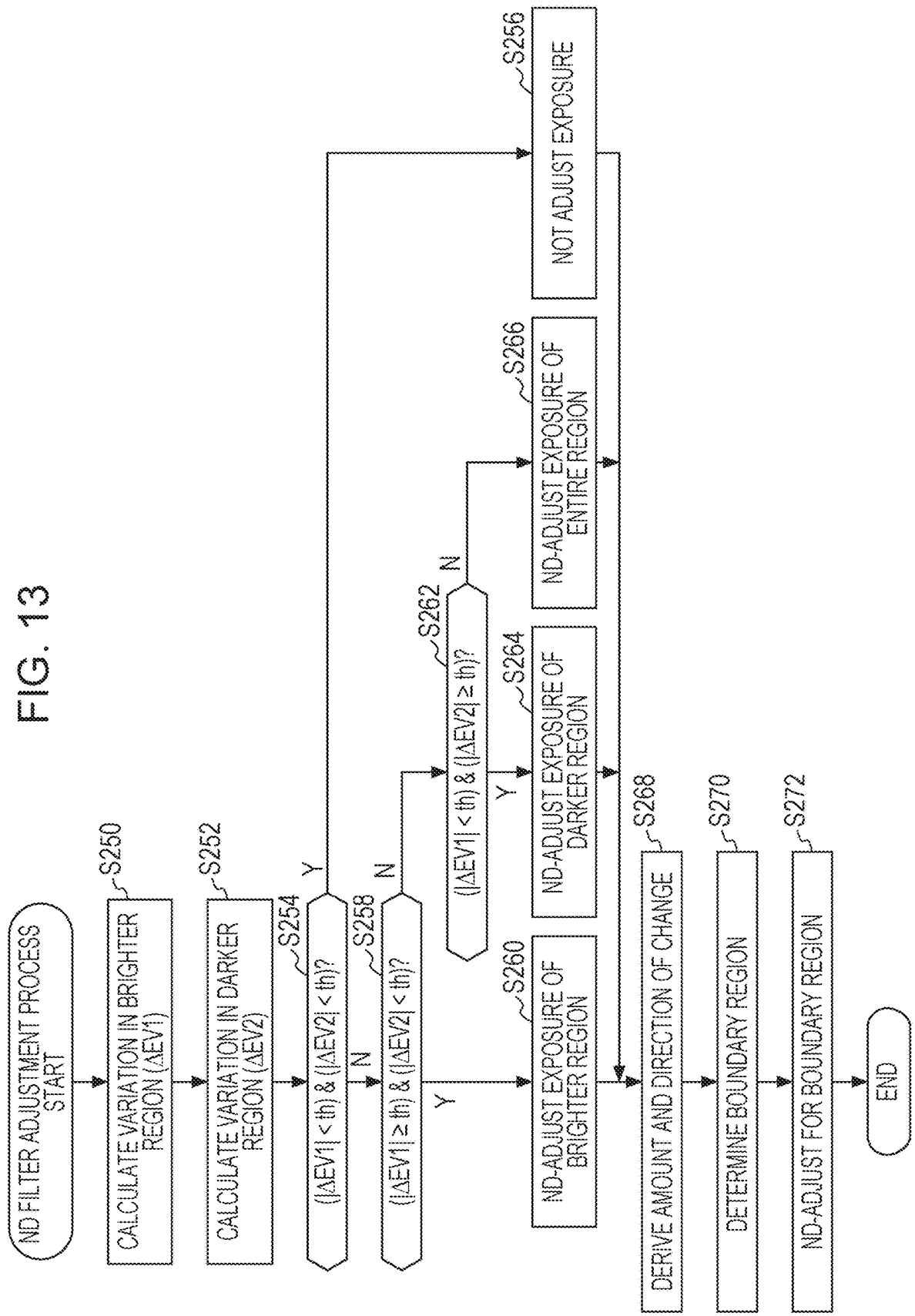
FIG. 13 is a flowchart illustrating an example flow of an ND filter adjustment process according to the second embodiment.

The ND filter adjustment process of this embodiment illustrated in FIG. 13 is different from the ND filter adjustment process of the first embodiment described above in that the process from step S268 to step S272 is performed.

As described above, with the process in step S256, step S260, step S264, and step S266 in the ND filter adjustment process, the degree of the ND filter 80 is derived.

Thereafter, as illustrated in FIG. 13, in step S268 of this embodiment, the CPU 74 derives the amount and direction of change in the live preview image 100 on the basis of the angular velocities in the respective directions sensed by the gyro sensor 70.

In the next step S270, the CPU 74 determines a boundary region including the boundary line 120 on the basis of the amount and direction of change derived in step S268 described above. In this embodiment, "boundary region" is a region that includes the boundary line 120 and in which the degree (light transmittance) of the ND filter 80 changes from one of the region 112 or the region 114 toward the other region, the region 112 and the region 114 being separated by the boundary line 120. In a case where the light transmittance of the ND filter 80 gradually changes near the boundary line 120, the boundary region is a region in which variations in the density (brightness) of the ND filter 80 have a gradient, that is, a gradation is provided.

Figure 14:
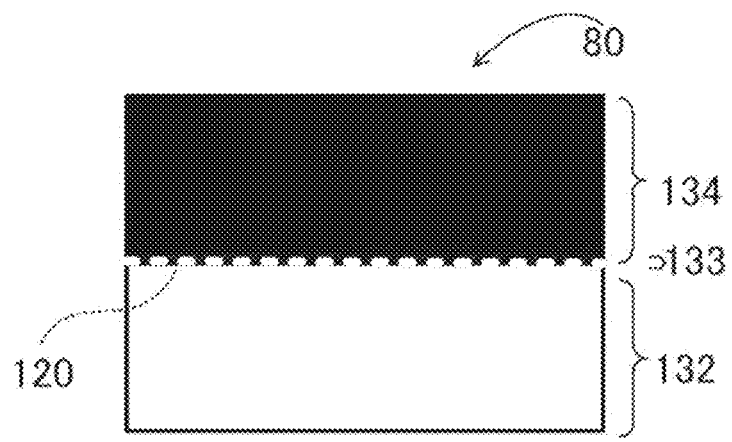
FIG. 14 is a diagram for explaining an example boundary region.

FIG. 14 schematically illustrates an example state where the CPU 74 drives the ND filter 80 for the live preview image 100, that is, an example state of the ND filter 80 for which the light transmittance is controlled. With reference to the schematic illustration of the ND filter 80 in FIG. 14, the ND filter adjustment process in the image capturing apparatus 10A of this embodiment will be described.

As described above, in the ND filter 80, the light transmittance of a portion corresponding to the region 112 is lower than that of a portion corresponding to the region 114. Therefore, as illustrated in FIG. 14, in the ND filter 80, the density of a portion 134 (hereinafter referred to as "ND filter portion 134") of the ND filter 80 corresponding to the region 112 is higher than that of a portion 132 (hereinafter referred to as "ND filter portion 132") of the ND filter 80 corresponding to the region 114. The ND filter 80 illustrated in FIG. 14 is in a state where the density (light transmittance) is switched between the ND filter portion 134 and the Ni) filter portion 132 in the position of the boundary line 120, that is, in a state where a gradation is not provided. In the image capturing apparatus 10A of this embodiment, a boundary region 133 in this case is the region of the boundary line 120 (a region in which pixels constituting the boundary line 120 are present).

In the image capturing apparatus 10A of this embodiment, for example, in a case where no motion occurs in the live preview image 100, the CPU 74 applies, to exposure control, the ND filter 80 in which a gradation is not provided for the density as in the ND filter 80 illustrated in FIG. 14.

On the other hand, in a case where, for example, the user moves the image capturing apparatus 10A relatively quickly, as a change (motion) in the live preview image 100 is quicker, it becomes more difficult for the boundary line 120 to move in response to the change, and a misalignment may occur, which is a concern. Therefore, in the image capturing apparatus 10A of this embodiment, in the case where a change occurs in the live preview image 100, the ND filter 80 in which a gradation is provided for the density is applied to exposure control. As the amount of change in the live preview image 100 increases, the width (the width in a direction crossing the boundary line 120) of the boundary region 133 in which a gradation is provided is made wider to thereby perform control for blurring the density near the boundary line 120.

Figure 15:
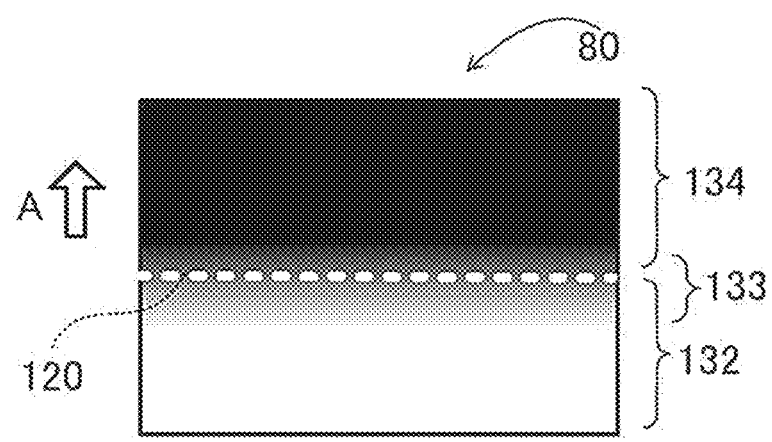
FIG. 15 is a diagram for explaining an example boundary region in a case of movement in a direction crossing a boundary line.
Figure 16:
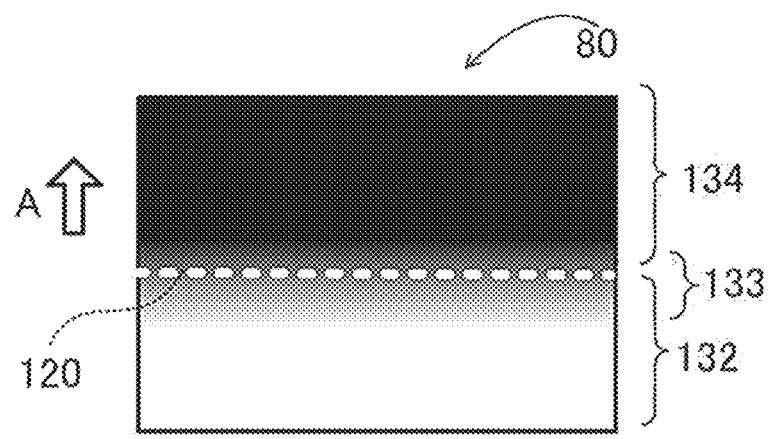
FIG. 16 is a diagram for explaining another example boundary region in a case of movement in a direction crossing a boundary line.

As in the example illustrated in FIG. 15, in a case where the image capturing apparatus 10A is moved in the direction of arrow A, which is an example of the direction crossing the boundary line 120, and a change occurs in the live preview image 100, the CPU 74 makes the ND filter 80 that is applied to exposure control to be the ND filter 80 in which a gradation is provided for the density in the boundary region 133 including the boundary line 120. As the amount of movement in the direction of arrow A increases, that is, the amount of change in the live preview image 100 increases, as in the example illustrated in FIG. 16, the CPU 74 makes the width of the boundary region 133 in the ND filter 80 to be applied to exposure control wider to make the gradient of the density gentler.

As described above, in a case where a change occurs in the live preview image 100 (the image capturing apparatus 10A moves) in the direction crossing the boundary line 120, as the amount of change increases, the CPU 74 of this embodiment makes the width of the boundary region 133 of the ND filter 80 to be applied to exposure control wider to make the gradient of the density gentler, and as the amount of change decreases, the CPU 74 makes the width of the boundary region 133 of the ND filter 80 to be applied to exposure control narrower to make the gradient of the density steeper.

Figure 17:
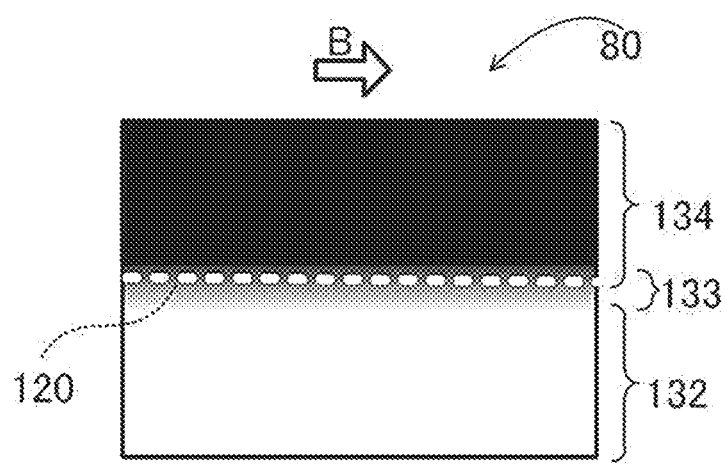
FIG. 17 is a diagram for explaining an example boundary region in a case of movement in a direction parallel to a boundary line.

As in the example illustrated in FIG. 17, also in a case where the image capturing apparatus 10A is moved in the direction of arrow B, which is an example of a direction parallel to the boundary line 120, and a change occurs in the live preview image 100, the CPU 74 makes the ND filter 80 that is applied to exposure control to be the ND filter 80 in which a gradation is provided for the density in the boundary region 133 including the boundary line 120. Here, "parallel" includes an error, and may be within a predetermined allowable range that can be regarded as parallel to the boundary line 120.

As described above, in the case where a change occurs in the live preview image 100 in the direction parallel to the boundary line 120, the boundary line 120 does not move or the amount of movement is smaller than that in the case where a change occurs in the live preview image 100 in the direction crossing the boundary line 120. Accordingly, a misalignment of the boundary line 120 is less likely to occur.

Accordingly, as in the example illustrated in FIG. 17, in a case where the amount of change is the same, the CPU 74 makes the width of the boundary region 133 of the ND filter 80 to be applied to exposure control narrower and makes the gradient of the density steeper than those in the case where a change occurs in the live preview image 100 in the direction crossing the same boundary line 120. In the case where a change occurs in the live preview image 100 (the image capturing apparatus 10A moves) in the direction parallel to the boundary line 120, the CPU 74 makes the width of the boundary region 133 of the ND filter 80 to be applied to exposure control constant regardless of the magnitude of the amount of change.

As described above, in step S270, the CPU 74 determines the width and position of the boundary region 133 including the boundary line 120 on the basis of the amount and direction of change derived in step S268 described above.

In the next step S272, the CPU 74 outputs, to the ND filter driving unit 82, an instruction for adjusting the degree (light transmittance) of the ND filter 80 for the boundary region 133 on the basis of determination in step S270 described above, and thereafter, the ND filter adjustment process ends.

As described above, in the image capturing apparatus 10A of this embodiment, as in the image capturing apparatus 10 of the first embodiment, in the case where a change occurs in the live preview image 100, the CPU 74 adjusts the position of the boundary line 120 and controls, on the basis of the brightness of the live preview image 100 after the change, the exposure of the regions separated by the boundary line 120. Therefore, regions for which exposure is controlled can be easily set. Therefore, as in the image capturing apparatus 10 of the first embodiment, regions for which exposure is controlled can be easily set.

In the image capturing apparatus 10A of this embodiment, the CPU 74 controls the width of the boundary region 133, that is, the gradient of the density (light transmittance) of the ND filter 80, on the basis of the amount and direction of change in the live preview image 100, and therefore, the occurrence of a false boundary due to a variance in the brightness near the boundary line 120 can be suppressed. Accordingly, with the image capturing apparatus 10A of this embodiment, a captured image having high image quality can be obtained.

Figure 18:
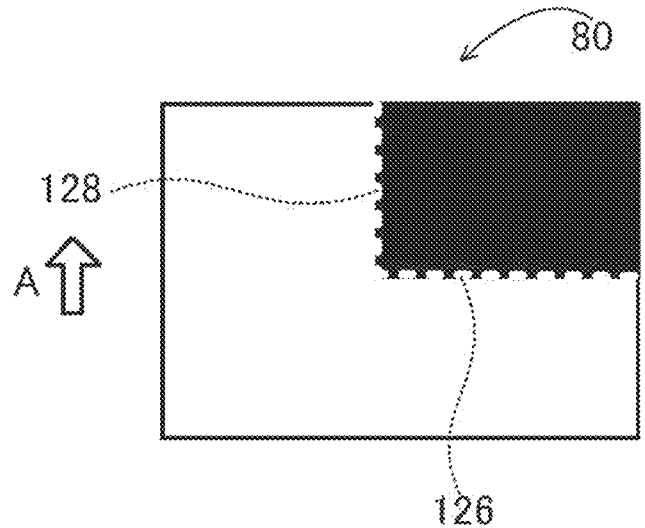
FIG. 18 is a diagram for explaining an example ND filter in a case of having two boundary lines crossing each other.
Figure 19:
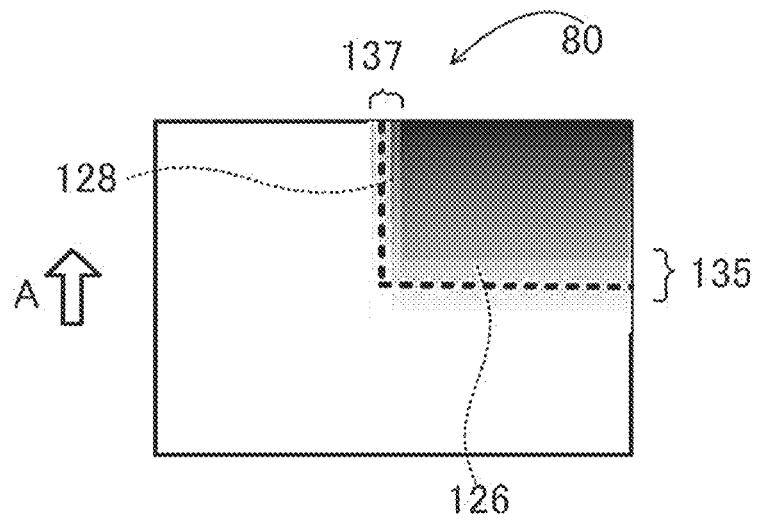
FIG. 19 is a diagram for explaining example boundary regions in an ND filter in a case of having two boundary lines crossing each other.

In this embodiment, the case has been described where the boundary line 120 is the only one boundary line for the live preview image 100; however, also in a case where a plurality of boundary lines are present, a similar operation can be performed. For example, as in the example illustrated in FIG. 18, in a case where the live preview image 100 has two crossing boundary lines, namely, a boundary line 126 and a boundary line 128, the CPU 74 determines the width of the boundary region 133 and so on, and adjusts the light transmittance of the ND filter 80, as described above, for each of the boundary line 126 and the boundary line 128 to adjust the light transmittance of the ND filter 80. For example, in a case where the ND filter 80 illustrated in FIG. 18 is applied and in a case where the image capturing apparatus 10A moves in the direction of arrow A, as in the example illustrated in FIG. 19, a boundary region 135 including the boundary line 126 is made wider in width and gentler in gradient of density than a boundary region 137 including the boundary line 128.

Third Embodiment

In this embodiment, a form will be described in which the way of moving the boundary line 120 in the case where a change occurs in the live preview image 100 is different from that in the first embodiment. In this embodiment, components the same as those described in the first embodiment described above are assigned the same reference numerals, and descriptions thereof will be omitted.

For example, as illustrated in FIG. 1 to FIG. 3, an image capturing apparatus 10B of this embodiment is different from the image capturing apparatus 10 of the first embodiment described above in that the image capturing apparatus 10B has an image capturing apparatus main body 12B instead of the image capturing apparatus main body 12.

For example, as illustrated in FIG. 3, the image capturing apparatus main body 12B is different from the image capturing apparatus main body 12 in that the image capturing apparatus main body 12B has a control unit 46B instead of the control unit 46. The control unit 46B is different from the control unit 46 in that the control unit 46B has a secondary storage unit 78B instead of the secondary storage unit 78.

For example, as illustrated in FIG. 3, the secondary storage unit 78B is different from the secondary storage unit 78 in that the secondary storage unit 78B stores an exposure control process program 79B instead of the exposure control process program 79. The CPU 74 reads from the secondary storage unit 78B and loads to the primary storage unit 76 the exposure control process program 79B, and performs an exposure control process illustrated in FIG. 20 in accordance with the loaded exposure control process program 79B. The CPU 74 executes the exposure control process program 79B to thereby function as the control unit of the present disclosure.

Now, as an operation of the image capturing apparatus 10B of this embodiment, the exposure control process illustrated in FIG. 20 will be described. For an operation the same as that in the first embodiment described above, a description thereof will be omitted.

Figure 20:
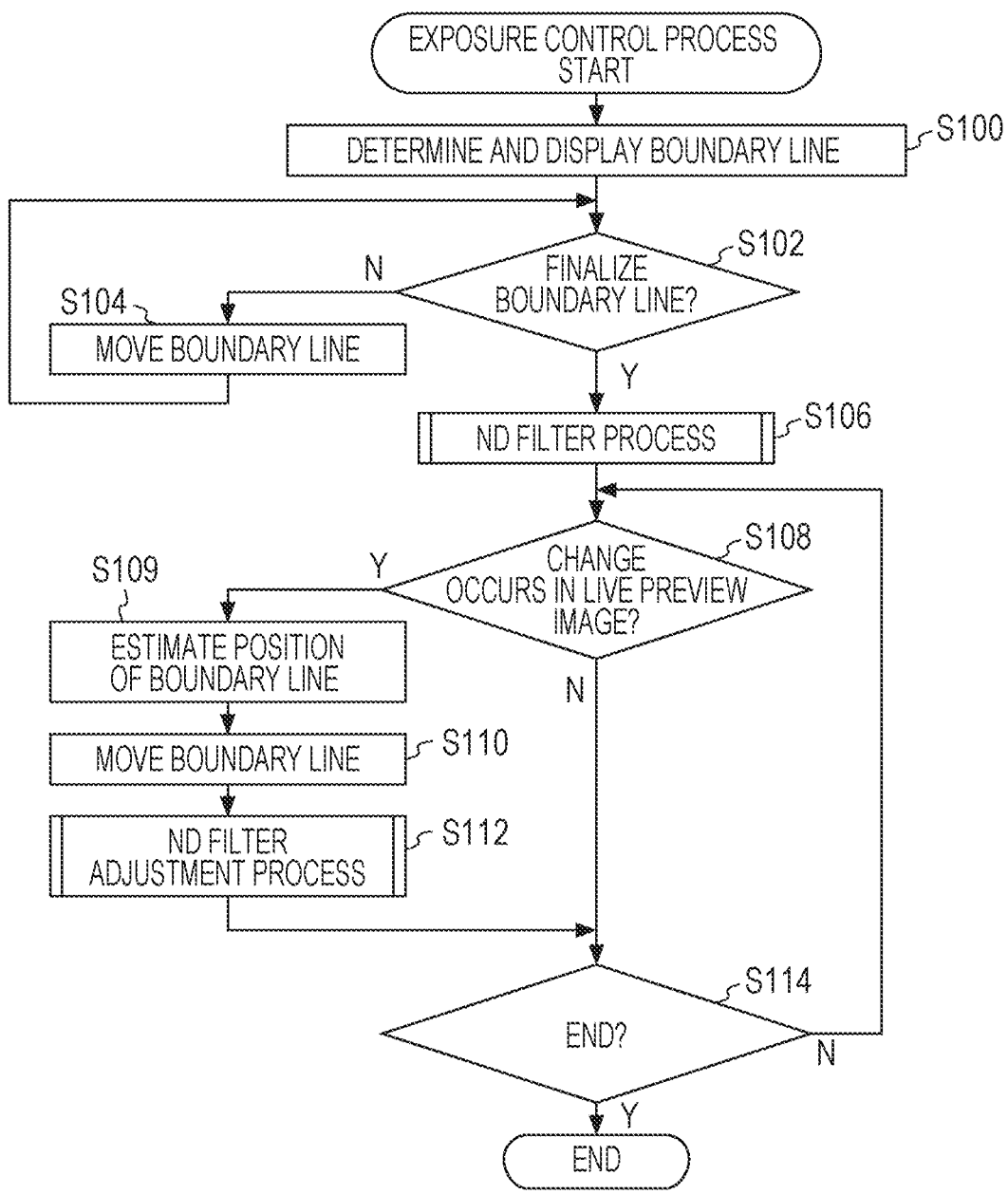
FIG. 20 is a flowchart illustrating an example flow of an exposure control process according to the third embodiment.

As illustrated in FIG. 20, the exposure control process of this embodiment is different from the exposure control process (see FIG. 4) of the first embodiment described above in that the process in step S109 is performed between step S108 and step S110.

Figure 21:
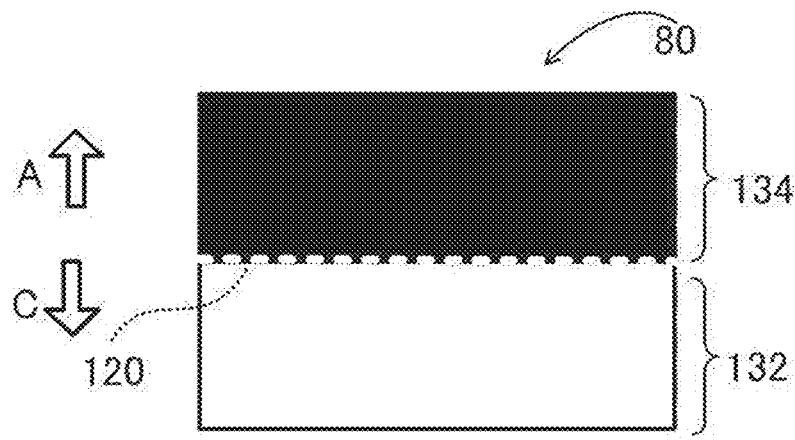
FIG. 21 is a diagram for explaining example estimation of the position of a boundary line.
Figure 22:
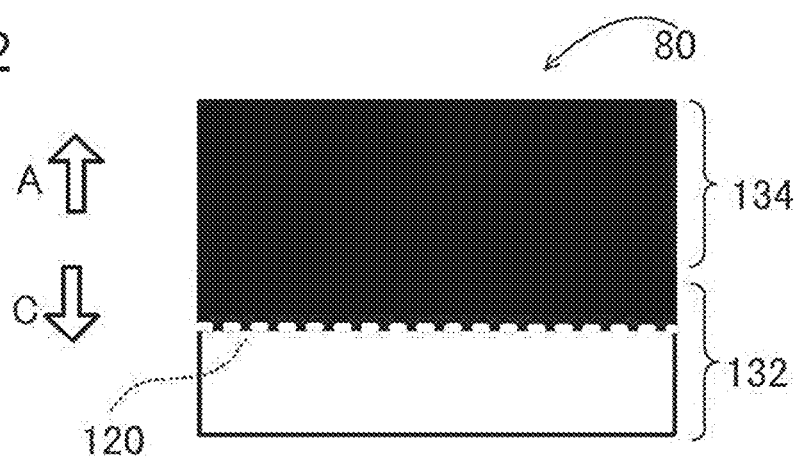
FIG. 22 is a diagram for explaining example estimation of the position of a boundary line.

In step S109 illustrated in FIG. 20, the CPU 74 estimates the position of the boundary line 120 in accordance with the acceleration of a change in the live preview image 100. For example, in a case where the image capturing apparatus 10B moves in the direction of arrow A as in the example illustrated in FIG. 21, the live preview image 100 (an image of a photographic subject) moves in the direction of arrow C. In this case, the boundary line 120 is moved in the direction of arrow C as in the example illustrated in FIG. 22.

For this, for example, the CPU 74 of this embodiment estimates the position of the boundary line 120 in accordance with the direction in which the image capturing apparatus 10B moves and the acceleration of movement.

The CPU 74 thus estimates the position of the boundary line 120 and, in the next step S110, the CPU 74 moves the boundary line 120 to the estimated position.

As described above, in the image capturing apparatus 10B of this embodiment, as in the image capturing apparatus 10 of the first embodiment, in the case where a change occurs in the live preview image 100, the CPU 74 adjusts the position of the boundary line 120 and controls, on the basis of the brightness of the live preview image 100 after the change, the exposure of the regions separated by the boundary line 120. Therefore, regions for which exposure is controlled can be easily set. Therefore, as in the image capturing apparatus 10 of the first embodiment, regions for which exposure is controlled can be easily set.

In the image capturing apparatus 10B of this embodiment, the CPU 74 estimates the position of the boundary line 120 in accordance with the direction in which the image capturing apparatus 10B moves and the acceleration of movement and moves the boundary line 120 to the estimated position. Accordingly, the live preview image 100 can be divided into the region 112 and the region 114 along the boundary line 120 in the estimated position, and regions for which exposure control is performed can be appropriate regions in accordance with the change in the live preview image 100.

Therefore, even in the case where a change occurs in the live preview image 100, the occurrence of a false boundary due to a variance in the brightness near the boundary line 120 can be suppressed. Accordingly, with the image capturing apparatus 10B of this embodiment, a captured image having high image quality can be obtained.

For convenience of description, the image capturing apparatuses 10, 10A, and 10B are hereinafter referred to as "image capturing apparatus" without the reference numerals in a case where the image capturing apparatuses need not be distinguished from each other. For convenience of description, the image capturing apparatus main bodies 12, 12A, and 12B are hereinafter referred to as "image capturing apparatus main body" without the reference numerals in a case where the image capturing apparatus main bodies need not be distinguished from each other. For convenience of description, the secondary storage units 78, 78A, and 78B are hereinafter referred to as "secondary storage unit" without the reference numerals in a case where the secondary storage units need not be distinguished from each other. Further, for convenience of description, in a case where the exposure control process programs 79, 79A, and 79B are collectively referred to, the exposure control process programs are referred to as "exposure control process program" without the reference numerals.

In the above-described embodiments, the form has been described in which the CPU 74 uses the ND filter 80 and the ND filter driving unit 82 to control the degree (light transmittance) of the ND filter 80, thereby controlling exposure; however, the form for controlling exposure by the ND filter process is not limited to this. For example, a form may be employed in which the CPU 74 controls the image signal processing circuit 52 to control the gains of image signals output from the imaging device 22, thereby performing the ND filter process to control exposure. Further, for example, a form may be employed in which the CPU 74 controls the shutter speed, thereby performing the ND filter process to control exposure.

In the above-described embodiments, the form has been described in which, in a case where the boundary line 120 moves, the exposure of the region 112 and the region 114 is adjusted; however, the form need not be employed, and a form in which the exposure is not adjusted may be employed or a form in which the user is allowed to set (give an instruction indicating) whether to adjust the exposure may be employed.

The above-described embodiments need not be employed. In a case of performing exposure bracketing image capturing, it is preferable not to move the boundary line 120 in accordance with a change in the live preview image 100. The user may be allowed to set (give an instruction indicating) whether to move the boundary line 120 in accordance with a change in the live preview image 100. Further, for example, a form may be employed in which the boundary line 120 is not moved in a case where, for example, only the orientation (vertical or horizontal) of the image capturing apparatus 10 is changed, and a predetermined condition based on which it is regarded that the image capture scene does not change is satisfied.

In the above-described embodiments, the case has been described where the angular velocities sensed by the gyro sensor 70 are used in a case where the CPU 74 derives information regarding movement of the live preview image 100; however, the above-described embodiments are not specifically limited to the case and, for example, an acceleration sensor may be used instead of the gyro sensor 70 or in addition to the gyro sensor 70.

Figure 23:
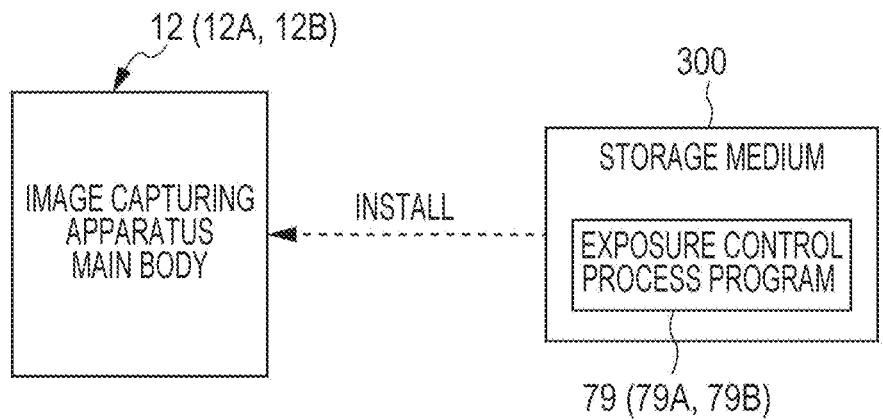
FIG. 23 is a schematic diagram illustrating an example form in which an exposure control process program according to the first to third embodiments is installed on an image capturing apparatus main body from a storage medium in which the exposure control process program is stored.

In the above-described embodiments, the example case where the exposure control process program is read from the secondary storage unit has been described; however, the exposure control process program need not be stored in the secondary storage unit 78 at the beginning. For example, as illustrated in FIG. 23, the exposure control process program may be stored in advance in any portable storage medium 300, such as an SSD (solid state drive), USB (universal serial bus) memory, or a CD-ROM (compact disc read-only memory). In this case, the exposure control process program stored in the storage medium 300 is installed on the image capturing apparatus main body, and the installed exposure control process program is executed by the CPU 74.

Alternatively, the exposure control process program may be stored in advance in a storage unit of another computer, server apparatus, or the like connected to the image capturing apparatus main body via a communication network (not illustrated), and the exposure control process program may be downloaded in response to a request from the image capturing apparatus main body. In this case, the downloaded exposure control process program is executed by the CPU 74.

The ND filter process described in the above-described embodiments is only an example. Therefore, an unnecessary step may be deleted, a new step may be added, or the order of processes may be changed without departing from the spirit, as a matter of course.

In the above-described embodiments, the example case where the ND filter process is implemented by using a software configuration using a computer has been described; however, the technique of the present disclosure is not limited to this. For example, instead of the software configuration using a computer, the ND filter process may be performed by using only a hardware configuration, such as an FPGA (field-programmable gate array) or an ASIC (application specific integrated circuit). Alternatively, the ND filter process may be performed by using a configuration obtained by combining the software configuration and the hardware configuration.

All documents, patent applications, and technical standards described in this specification are incorporated herein by reference to the same extent as in a case where the documents, patent applications, and technical standards are specifically and individually described as being incorporated herein by reference.

REFERENCE SIGNS LIST 10, 10A, 10B image capturing apparatus
12, 12A, 12B image capturing apparatus main body
13, 15 mount
14 image capturing lens
16 focus ring
18 lens unit
19 aperture diaphragm
20 focus lens
22 imaging device
22A photosensitive surface
24 dial
26 release button
28 display
29 touch panel display
30 cross key
32 MENU/OK key
34 BACK/DISP button
36 viewfinder
38 touch panel
40 control device
42 first mirror
44 second mirror
46, 46A, 46B control unit
48 mirror driving unit
50 imaging device driver
52 image signal processing circuit
54 image memory
56 image processing unit
58 display control unit
60 accepting I/F
62 accepting device
64 medium I/F
66 memory card
68 sensor I/F
70 gyro sensor
72 external I/F
74 CPU
76 primary storage unit
78, 78A, 78B secondary storage unit
79, 79A, 79B exposure control process program
80 ND filter
81 bus line
82 ND filter driving unit
100 live preview image
102 sea image
104 sky image
112, 114 region
120, 126, 128 boundary line
200 histogram
202, 204 peak
206 range
208 brightness value
132, 134 ND filter portion
133, 135, 137 boundary region
300 storage medium
A, B, C arrow
α photosensitive surface cover position
β photosensitive surface open position
L1 optical axis

What is claimed is:

1. An image capturing apparatus comprising:
an image sensor that outputs an image signal obtained by image capturing by an imaging device, the imaging device performing image capturing of a photographic subject through an image capturing optical system;
a display that displays a captured image based on the image signal; and
a processor configured to determine, on the basis of a result of analysis of the captured image, a position of a boundary line along which the captured image is divided into a plurality of regions, adjust, in a case where a change occurs in the captured image, the determined position of the boundary line on the basis of the change in the captured image, and control, on the basis of a brightness of the captured image after the change, an exposure for at least one of the plurality of regions separated by the adjusted boundary line,
wherein the processor further configured to perform control to gradually change an exposure of a boundary region including the boundary line in the captured image and make a degree to which the exposure is changed differ depending on the rate of the change in the captured image.

2. The image capturing apparatus according to claim 1, wherein
the processor configured to control, for a region, among the plurality of regions, in which a brightness changes due to the change in the captured image, an exposure for the region in accordance with the brightness of the region after the change.

3. The image capturing apparatus according to claim 1, wherein
the processor configured to adjust the position of the boundary line by moving the position of the boundary line at a rate corresponding to a rate or an acceleration of the change in the captured image.

4. The image capturing apparatus according to claim 2, wherein
the processor configured to adjust the position of the boundary line by moving the position of the boundary line at a rate corresponding to a rate or an acceleration of the change in the captured image.

5. The image capturing apparatus according to claim 1, wherein
the processor configured to decrease the degree to which the exposure is changed as the rate of the change in the captured image increases.

6. The image capturing apparatus according to claim 1, wherein
the processor configured to determine a width of the boundary region in accordance with the rate of the change in the captured image.

7. The image capturing apparatus according to claim 1, wherein
the processor configured to make a direction in which the exposure is changed differ depending on an orientation of the change in the captured image.

8. The image capturing apparatus according to claim 1, wherein
the processor configured to determine a width of the boundary region it accordance with an orientation of the change in the captured image.

9. The image capturing apparatus according to claim 1, wherein
the processor configured to estimate the position of the boundary line after the change in accordance with the change in the captured image and adjust the position of the boundary line to the estimated position.

10. The image capturing apparatus according to claim 5, wherein
the processor configured to estimate the position of the boundary line after the change in accordance with the change in the captured image and adjust the position of the boundary line to the estimated position.

11. The image capturing apparatus according to claim 6, wherein
the processor configured to estimate the position of the boundary line after the change in accordance with the change in the captured image and adjust the position of the boundary line to the estimated position.

12. The image capturing apparatus according to claim 7, wherein
the processor configured to estimate the position of the boundary line after the change in accordance with the change in the captured image and adjust the position of the boundary line to the estimated position.

13. The image capturing apparatus according to claim 8, wherein
the processor configured to estimate the position of the boundary line after the change in accordance with the change in the captured image and adjust the position of the boundary line to the estimated position.

14. A control method for an image capturing apparatus, the control method including a process comprising:
displaying, on a display, a captured image based on an image signal obtained by image capturing by an imaging device, the imaging device performing image capturing of a photographic subject through an image capturing optical system;
determining, on the basis of a result of analysis of the captured image, a position of a boundary line along which the captured image is divided into a plurality of regions;
adjusting, in a case where a change occurs in the captured image, the determined position of the boundary line on the basis of the change in the captured image; and
controlling, on the basis of a brightness of the captured image after the change, an exposure for at least one of the plurality of regions separated by the adjusted boundary line,
wherein the controlling is configured to control to gradually change an exposure of a boundary region including the boundary line in the captured image and to make a degree to which the exposure is changed differ depending on the rate of the change in the captured image.

15. A non-transitory computer readable medium having a control program for an image capturing apparatus, the control program causing a computer to perform a process comprising:
displaying, on a display, a captured image based on an image signal obtained by image capturing by an imaging device, the imaging device performing image capturing of a photographic subject through an image capturing optical system;
determining, on the basis of a result of analysis of the captured image, a position of a boundary line along which the captured image is divided into a plurality of regions;
adjusting, in a case where a change occurs in the captured image, the determined position of the boundary line on the basis of the change in the captured image; and
controlling, on the basis of a brightness of the captured image after the change, an exposure for at least one of the plurality of regions separated by the adjusted boundary line,
wherein the controlling is configured to control to gradually change an exposure of a boundary region including the boundary line in the captured image and to make a degree to which the exposure is changed differ depending on the rate of the change in the captured image.

* * * * *